US010667294B2

(12) United States Patent
Heo et al.

(10) Patent No.: US 10,667,294 B2
(45) Date of Patent: May 26, 2020

(54) CARRIER-SENSING TECHNIQUES FOR LTE-BASED TRANSMISSIONS OVER UNLICENSED CARRIERS

(71) Applicant: INTEL IP CORPORATION, Santa Clara, CA (US)

(72) Inventors: Youn Hyoung Heo, Seoul (KR); Hwan-Joon Kwon, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 109 days.

(21) Appl. No.: 15/558,003

(22) PCT Filed: Dec. 24, 2015

(86) PCT No.: PCT/US2015/000439
§ 371 (c)(1),
(2) Date: Sep. 13, 2017

(87) PCT Pub. No.: WO2016/163973
PCT Pub. Date: Oct. 13, 2016

(65) Prior Publication Data
US 2018/0049241 A1    Feb. 15, 2018

Related U.S. Application Data

(60) Provisional application No. 62/144,832, filed on Apr. 8, 2015.

(51) Int. Cl.
*H04W 4/00* (2018.01)
*H04W 74/08* (2009.01)
(Continued)

(52) U.S. Cl.
CPC ..... *H04W 74/0808* (2013.01); *H04L 27/2626* (2013.01); *H04W 72/044* (2013.01);
(Continued)

(58) Field of Classification Search
CPC ...... H04W 72/04; H04W 88/08; H04W 76/00
See application file for complete search history.

(56) References Cited

U.S. PATENT DOCUMENTS

2014/0341018 A1   11/2014   Bhushan et al.
2015/0117333 A1*  4/2015   Wang ............... H04L 1/1829
                                                  370/329
(Continued)

OTHER PUBLICATIONS

International Search Report and Written Opinion, dated Apr. 14, 2016, Application No. PCT/US2015/000439, filed Dec. 24, 2015, pp. 4.
(Continued)

*Primary Examiner* — Siren Wei
(74) *Attorney, Agent, or Firm* — Eschweiler & Potashnik, LLC

(57) ABSTRACT

Carrier-sensing techniques for LTE-based transmissions over unlicensed carriers are described. In one embodiment, for example, an apparatus may comprise at least one memory and logic for user equipment (UE), at least a portion of the logic comprised in circuitry coupled to the at least one memory, the logic to cause the UE to receive an uplink (UL) grant indicating a transmit subframe, the transmit subframe to comprise a subframe during which the UE is authorized to perform UL transmission via an unlicensed carrier, the logic to cause the UE to determine whether the UL grant comprises a listen-before-talk (LBT)-contingent UL grant and in response to a determination that the UL grant comprises an LBT-contingent UL grant, identify an LBT interval for the transmit subframe and perform an LBT procedure during the LBT interval to determine whether the unlicensed carrier is idle. Other embodiments are described and claimed.

19 Claims, 18 Drawing Sheets

(51) Int. Cl.
*H04L 27/26* (2006.01)
*H04W 72/04* (2009.01)
*H04W 72/14* (2009.01)
*H04W 72/12* (2009.01)
*H04W 88/02* (2009.01)

(52) U.S. Cl.
CPC ........ *H04W 72/14* (2013.01); *H04W 72/1289* (2013.01); *H04W 88/02* (2013.01)

(56) References Cited

U.S. PATENT DOCUMENTS

| | | | |
|---|---|---|---|
| 2015/0146680 A1* | 5/2015 | Luo | H04L 5/0035 370/330 |
| 2015/0349931 A1* | 12/2015 | Damnjanovic | H04J 11/00 370/280 |
| 2016/0127098 A1* | 5/2016 | Ng | H04L 5/001 370/329 |
| 2016/0143014 A1* | 5/2016 | Mukherjee | H04W 74/0816 370/330 |
| 2016/0278048 A1* | 9/2016 | Nory | H04L 1/0079 |
| 2017/0251497 A1* | 8/2017 | Larsson | H04W 74/0816 |

OTHER PUBLICATIONS

Samsung "Discussion on UL transmission for LAA", 3GPP Draft; R1-144744, 3rd Generation Partnership Project (3GPP), Mobile Competence Centre; 650, Route des Lucioles; F-06921 Sophia-Antipolis Cedex; France, vol. RAN WG1, No. San Francisco, USA; 20141117-20141121 Nov. 17, 2017, XP050875822, retrieved from http://www.3gpp.org/ftp/Meetings_3GPP_SYNC/RAN1/DOCS.

Intel Corporation, "LBT Design for LAA Downlink", 3GPP Draft; R1-151104, Intel-LBT, 3rd Generation Partnership Project (3GPP), Mobile Competence Centre; 650 Route des Lucioles; F-06921 Sophia-Antipolis Cedex; France, vol. 1 RAN WG1, No. Paris. France, 20150324-20150326, Mar. 18, 2015, XP050951443, retrieved from http://www.gpgg.org/ftp/tsg_ran/WG1_RL1/TSGR1_AH/LTE_LAA_1503/Docs.

Kyocera, "Further Consideration on the Essential Functionalities for LAA", 3GPP Draft, R1-144955, 3rd Generation Partnership Project (3GPP), Mobile Competence Centre; 650 Route des Lucioles, F-06921 Sophia-Antipolis Cedex; France, vol. RAN WG1, No. San Francisco, USA, 20141117-20141121, Nov. 17, 2014, XP050895108, retrieved from http://www.3gpp.org/ftp/Meetings_3GPP_SYNC/RAN1/Docs.

* cited by examiner

CARRIER-SENSING TECHNIQUES FOR LTE-BASED TRANSMISSIONS OVER UNLICENSED CARRIERS

CROSS-REFERENCE TO RELATED APPLICATIONS

This application is a national stage application claiming the benefit of and priority to International Application No. PCT/US2015/000439 entitled "CARRIER-SENSING TECHNIQUES FOR LTE-BASED TRANSMISSIONS OVER UNLICENSED CARRIERS" filed Dec. 24, 2015, which claims the benefit of U.S. Provisional Application Ser. No. 62/144,832, filed Apr. 8, 2018; both of which are hereby incorporated by reference in their entirety.

TECHNICAL FIELD

Embodiments herein generally relate to communications between devices in broadband wireless communications networks.

BACKGROUND

In any given geographical region, some portions of wireless spectrum may be licensed for exclusive use by particular wireless service providers/operators according to particular radio access technologies (RATs). Other, unlicensed portions of wireless spectrum may be concurrently used by multiple service providers/operators, and/or may be concurrently used for wireless communications according to multiple RATs. In order to accommodate the ever-growing demand for wireless broadband data services, it may desirable to use such unlicensed spectrum for 3rd Generation Partnership Project (3GPP) Long Term Evolution (LTE)-based wireless communications. The use of unlicensed spectrum for LTE-based wireless communications may be referred to as LTE in Unlicensed Spectrum (LTE-U). In some systems, LTE-U may be combined with LTE-based wireless communications over licensed spectrum using carrier aggregation, a technique that may be referred to as Licensed-Assisted Access (LAA) using LTE, or simply LAA. In an LAA system, wireless communications in a primary cell (PCell) may be performed using an LTE licensed carrier, while wireless communications in one or more secondary cells (SCells) may be performed using one or more LTE-U carriers.

With respect to an unlicensed carrier, in order to support coexistence between a given LTE-U service provider/operator and other LTE-U service providers/operators and/or wireless communications performed according to other RATs, it may be desirable to implement a listen-before-talk (LBT) scheme. According to an LBT scheme, before initiating transmission over a given unlicensed carrier, a transmitting device may generally be required to substantially confirm that the unlicensed carrier is not already in use. In the context of an LTE-U carrier, an LBT scheme may require a transmitting evolved node B (eNB) or user equipment (UE) to perform a carrier sensing procedure, such as a clear channel assessment (CCA), before transmitting over the LTE-U carrier. According to some LBT schemes, the transmitting eNB or UE may be required to perform a backoff following a detection that the LTE-U carrier is already in use. In some geographical regions, it may be necessary to implement an LBT scheme in conjunction with communications over LTE-U carriers in order to comply with applicable regulations requiring the use of LBT when communicating over unlicensed spectrum. In other regions, LBT may not be required, but may still be a valuable technique for supporting fair coexistence between different service providers/operators and/or RATs with respect to unlicensed carriers.

DETAILED DESCRIPTION

Figure 1:
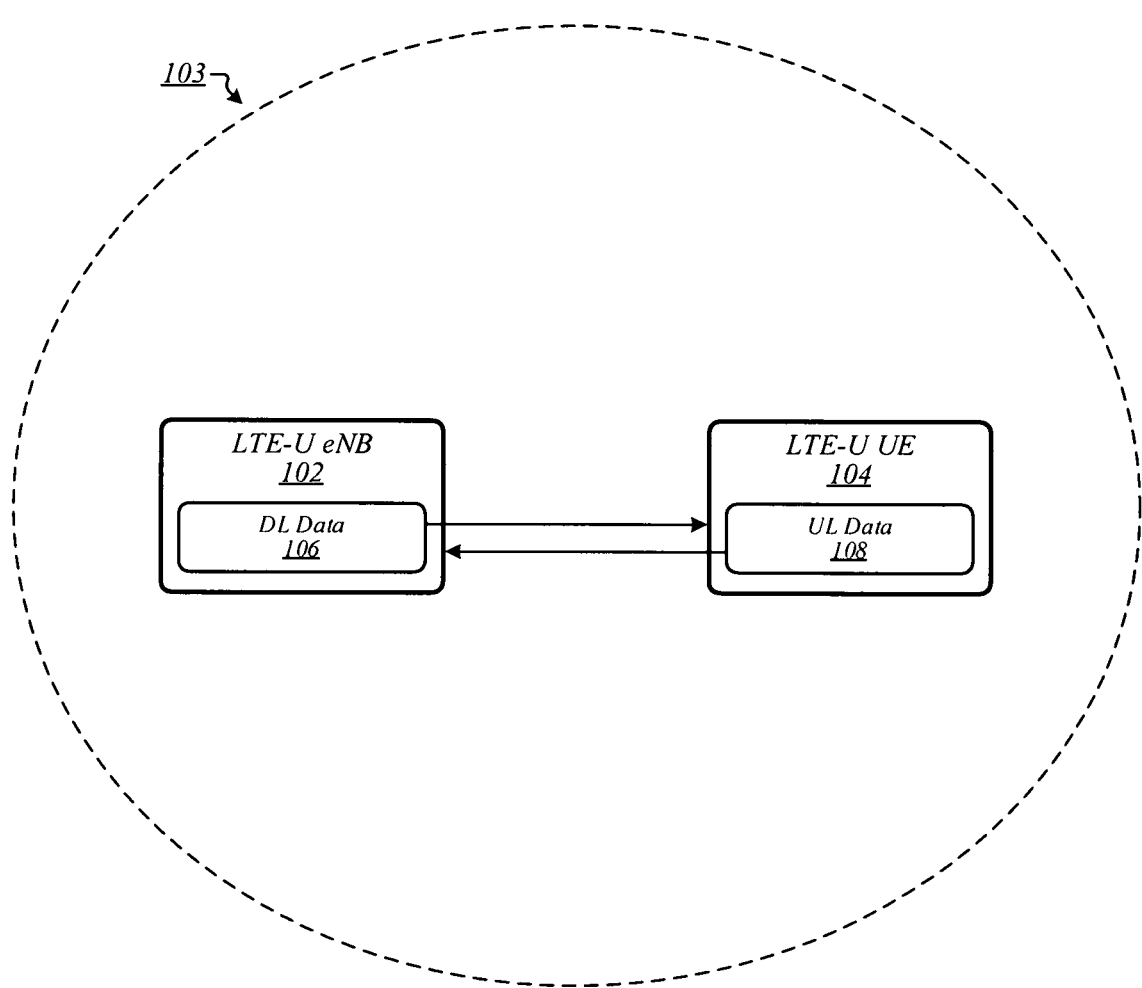
FIG. 1 illustrates an embodiment of an operating environment.

Various embodiments may be generally directed to carrier-sending techniques for LTE-based transmissions over unlicensed carriers. In one embodiment, for example, an apparatus may comprise at least one memory and logic for user equipment (UE), at least a portion of the logic comprised in circuitry coupled to the at least one memory, the logic to cause the UE to receive an uplink (UL) grant indicating a transmit subframe, the transmit subframe to comprise a subframe during which the UE is authorized to perform UL transmission via an unlicensed carrier, the logic to cause the UE to determine whether the UL grant comprises a listen-before-talk (LBT)-contingent UL grant and in response to a determination that the UL grant comprises an LBT-contingent UL grant, identify an LBT interval for the transmit subframe and perform an LBT procedure during the LBT interval to determine whether the unlicensed carrier is idle. Other embodiments are described and claimed.

Various embodiments may comprise one or more elements. An element may comprise any structure arranged to perform certain operations. Each element may be implemented as hardware, software, or any combination thereof, as desired for a given set of design parameters or performance constraints. Although an embodiment may be described with a limited number of elements in a certain topology by way of example, the embodiment may include more or less elements in alternate topologies as desired for a given implementation. It is worthy to note that any reference to "one embodiment" or "an embodiment" means that a particular feature, structure, or characteristic described in connection with the embodiment is included in at least one embodiment. The appearances of the phrases "in one embodiment," "in some embodiments," and "in various embodiments" in various places in the specification are not necessarily all referring to the same embodiment.

The techniques disclosed herein may involve transmission of data over one or more wireless connections using one or more wireless mobile broadband technologies. For example, various embodiments may involve transmissions over one or more wireless connections according to one or more 3rd Generation Partnership Project (3GPP), 3GPP Long Term Evolution (LTE), and/or 3GPP LTE-Advanced (LTE-A) technologies and/or standards, including their revisions, progeny and variants. Various embodiments may additionally or alternatively involve transmissions according to one or more Global System for Mobile. Communications (GSM)/Enhanced Data Rates for GSM Evolution (EDGE), Universal Mobile Telecommunications System (UMTS)/ High Speed Packet Access (HSPA), and/or GSM with General Packet Radio Service (GPRS) system (GSM/GPRS) technologies and/or standards, including their revisions, progeny and variants.

Examples of wireless mobile broadband technologies and/or standards may also include, without limitation, any of the Institute of Electrical and Electronics Engineers (IEEE) 802.16 wireless broadband standards such as IEEE 802.16m and/or 802.16p, International Mobile Telecommunications Advanced (IMT-ADV), Worldwide Interoperability for Microwave Access (WiMAX) and/or WiMAX II, Code Division Multiple Access (CDMA) 2000 (e.g., CDMA2000 1×RTT, CDMA2000 EV-DO, CDMA EV-DV, and so forth), High Performance Radio Metropolitan Area Network (HIPERMAN), Wireless Broadband (WiBro), High Speed Downlink Packet Access (HSDPA), High Speed Orthogonal Frequency-Division Multiplexing (OFDM) Packet Access (HSOPA), High-Speed Uplink Packet Access (HSUPA) technologies and/or standards, including their revisions, progeny and variants.

Some embodiments may additionally or alternatively involve wireless communications according to other wireless communications technologies and/or standards. Examples of other wireless communications technologies and/or standards that may be used in various embodiments may include, without limitation, other IEEE wireless communication standards such as the IEEE 802.11, IEEE 802.11a, IEEE 802.11b, IEEE 802.11g, IEEE 802.11n, IEEE 802.11u, IEEE 802.11ac, IEEE 802.11ad, IEEE 802.11af, and/or IEEE 802.11ah standards, High-Efficiency Wi-Fi standards developed by the IEEE 802.11 High Efficiency WLAN (HEW) Study Group, Wi-Fi Alliance (WFA) wireless communication standards such as Wi-Fi, Wi-Fi Direct, Wi-Fi Direct Services, Wireless Gigabit (WiGig), WiGig Display Extension (WDE), WiGig Bus Extension (WBE), WiGig Serial Extension (WSE) standards and/or standards developed by the WFA Neighbor Awareness Networking (NAN) Task Group, machine-type communications (MTC) standards such as those embodied in 3GPP Technical Report (TR) 23.887, 3GPP Technical Specification (TS) 22.368, and/or 3GPP TS 23.682, and/or near-field communication (NFC) standards such as standards developed by the NFC Forum, including any revisions, progeny, and/or variants of any of the above. The embodiments are not limited to these examples.

In addition to transmission over one or more wireless connections, the techniques disclosed herein may involve transmission of content over one or more wired connections through one or more wired communications media. Examples of wired communications media may include a wire, cable, metal leads, printed circuit board (PCB), backplane, switch fabric, semiconductor material, twisted-pair wire, co-axial cable, fiber optics, and so forth. The embodiments are not limited in this context.

FIG. 1 illustrates an example of an operating environment 100 that may be representative of various embodiments. In operating environment 100, an LTE-U eNB 102 serves an LTE-U cell 103. LTE-U eNB 102 may generally comprise an eNB that is configured to perform, schedule, and/or otherwise manage LTE-based wireless communications over one or more LTE-U carriers that are used in LTE-U cell 103. LTE-U UE 104 may generally comprise a UE that is configured with the ability to engage in LTE-based wireless communications over one or more LTE-U carriers used in LTE-U cell 103. In some embodiments, LTE-U UE 104 may be served by an LAA system, and LTE-U cell 103 may operate as an SCell of that LAA system. In various embodiments, an LBT scheme may be implemented with respect to LTE-based wireless communications in LTE-U cell 103. In some embodiments, according to the LBT scheme, LTE-U eNB 102 may be required to perform an LBT procedure before transmitting downlink (DL) data 106 to LTE-U UE 104 over an LTE-U carrier.

Figure 2:
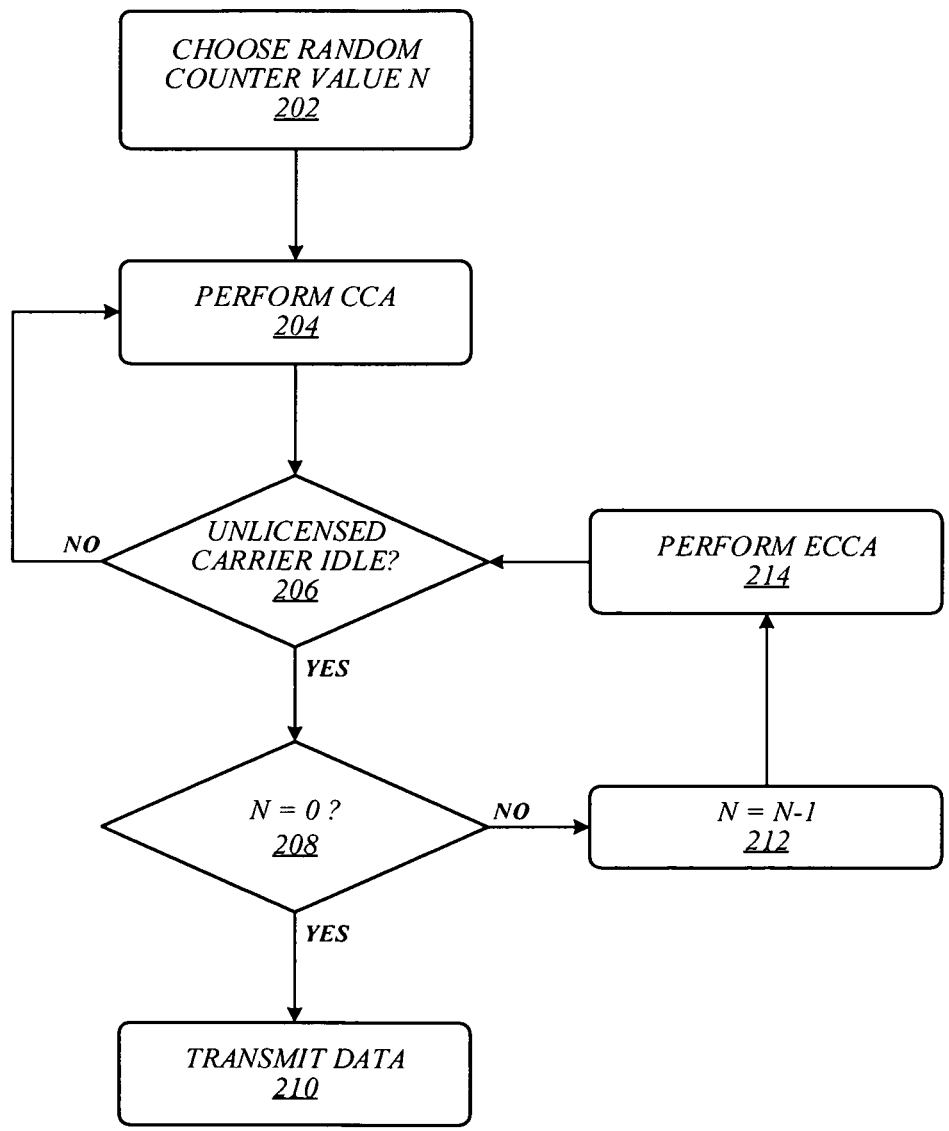
FIG. 2 illustrates an embodiment of a first logic flow.

FIG. 2 illustrates an example of a logic flow 200 that may be representative of an LBT procedure that may be performed in various embodiments by LTE-U eNB 102 of FIG. 1 when it has DL data 106 for transmission to LTE-U UE 104 via a given unlicensed carrier. As shown in FIG. 2, a random counter value N may be chosen at 202. At 204, a CCA may be performed. Following the CCA at 204, flow may pass to 206, and may then proceed from 206 in a manner depending on whether the CCA at 204 indicates that the unlicensed carrier is idle. If the CCA indicates that the unlicensed carrier is not idle, flow may return to 204, where another CCA may be performed. If the CCA indicates that the unlicensed carrier is idle, flow may proceed to 208.

At 208, it may be determined whether the value of N is equal to zero. If it is determined at 208 that the value of N is equal to zero, flow may pass to 210, where DL data may be transmitted. If it is determined at 208 that the value of N is not equal to zero, flow may pass to 212, where N may be decremented. From 212, flow may pass to 214, where an enhanced CCA (eCCA) may be performed. From 214, flow may return to 206, and may then proceed from 206 in a manner depending on whether the eCCA at 214 indicates that the unlicensed carrier is idle. If the eCCA at 214 indicates that the unlicensed carrier is idle, flow may once again pass from 206 to 208. If the eCCA at 214 indicates that the unlicensed carrier is not idle, flow may pass from 206 back to 204. The embodiments are not limited in this context.

In some embodiments, the eCCA(s) that may be performed at 214 may comprise a sensing duration that differs from a sensing duration associated with the CCA(s) that may be performed at 204. In various embodiments, the eCCA(s) that may be performed at 214 may comprise a lesser sensing duration than the CCA(s) that may be performed at 204. In some embodiments, for example, the CCA(s) that may be performed at 204 may comprise a 40 μs sensing duration and the eCCA(s) that may be performed at 214 may comprise a 10 μs sensing duration. The embodiments are not limited to this example.

Returning to FIG. 1, in various embodiments, according to aforementioned LBT scheme that may be implemented with respect to LTE-based wireless communications in LTE-U cell 103, LTE-U UE 104 may be required to perform an LBT procedure before transmitting uplink (UL) data 108 to LTE-U eNB 102 over an LTE-U carrier. In some embodiments, this LTE-U carrier may be the same as that used by LTE-U eNB 102 to transmit DL data 106 to LTE-U UE 104. In other embodiments, this LTE-U carrier may comprise a different LTE-U carrier than that used by LTE-U eNB 102. The embodiments are not limited in this context.

In various embodiments, LTE-U eNB 102 may be free to choose the subframes, slots, OFDM symbols, and/or other time resources that it uses to transmit DL data 106, but LTE-U UE 104 may only be able to use particular time resources that it has been assigned by LTE-U eNB 102 for transmission of UL data 108. In some embodiments, due to this lack of flexibility at LTE-U UE 104, the LBT procedure used by LTE-U eNB 102 in conjunction with transmission of DL data 106 may be sub-optimal for use by LTE-U UE 104 in conjunction with transmission of UL data 108. As such, in various embodiments, it may be desirable that LTE-U UE 104 use a dedicated UL LBT procedure that differs from a DL LBT procedure used by LTE-U eNB 102. In some embodiments, for example, it may be desirable that LTE-U eNB 102 use a DL LBT procedure corresponding to that depicted in logic flow 200 of FIG. 2, but may be desirable that LTE-U UE 104 use a UL LBT procedure that differs from that depicted in logic flow 200 of FIG. 2. The embodiments are not limited to this example.

Figure 3:
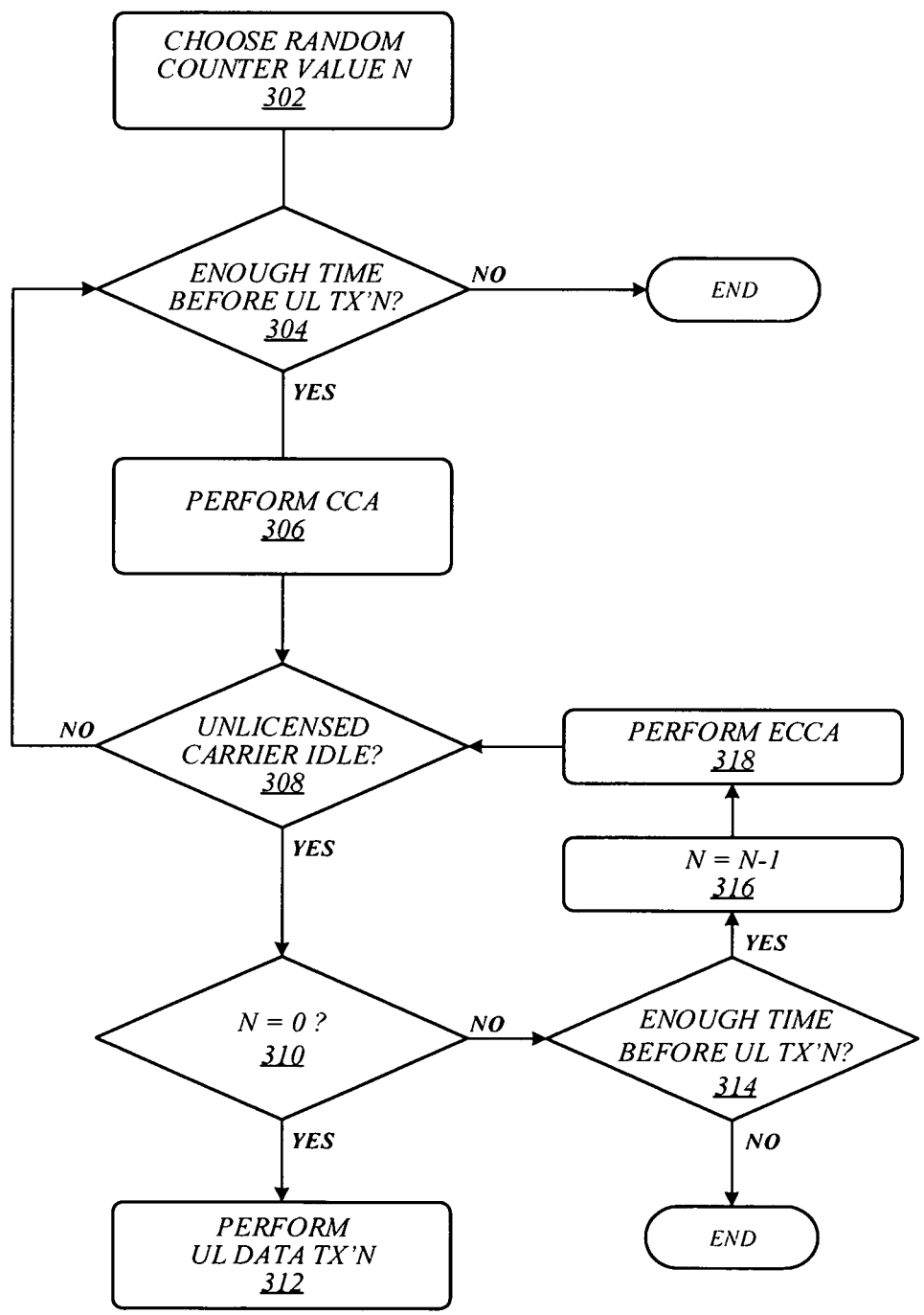
FIG. 3 illustrates an embodiment of a second logic flow.

FIG. 3 illustrates an example of a logic flow 300 that may be representative of a UL LBT procedure that may be implemented in various embodiments in order to account for timing constraints that may be associated with LTE-based uplink data transmission over an unlicensed carrier, such as an LTE-U carrier. For example, logic flow 300 may be representative of a UL LBT procedure that may be performed by LTE-U UE 104 of FIG. 1 following receipt of a UL grant indicating that resources of a particular subframe have been allocated for a UL transmission of UL data 108 to LTE-U eNB 102. As shown in FIG. 3, a random counter value N may be chosen at 302. At 304, it may be determined whether enough time remains before a scheduled start time for the UL transmission. In some embodiments, this determination may be based on one or more of the value of N, the duration of the CCA(s) that may be performed at 306, and the duration of the eCCA(s) that may be performed at 318. If it is determined at 304 that insufficient time remains before the scheduled start time for the UL transmission, the logic flow may end. If it is determined at 304 that sufficient time remains before the scheduled start time for the UL transmission, flow may pass to 306.

At 306, a CCA may be performed. Following the CCA at 306, flow may pass to 308, and may then proceed from 308 in a manner depending on whether the CCA at 306 indicates that the unlicensed carrier is idle. If the CCA indicates that the unlicensed carrier is not idle, flow may return to 304. If the CCA indicates that the unlicensed carrier is idle, flow may proceed to 310. At 310, it may be determined whether the value of N is equal to zero. If it is determined at 310 that the value of N is equal to zero, flow may pass to 312, where the UL data transmission may be performed during the subframe comprising the allocated resources for the UL data transmission. If it is determined at 310 that N is not equal to zero, flow may pass to 314.

At 314, it may once again be determined whether enough time remains before the scheduled start time for the UL transmission. If it is determined at 314 that insufficient time remains before the scheduled start time for the UL transmission, the logic flow may end. If it is determined at 314 that sufficient time remains before the scheduled start time for the UL transmission, flow may pass to 316, where N may be decremented. From 316, flow may pass to 318, where an eCCA may be performed. From 318, flow may return to 308, and may then proceed from 308 in a manner depending on whether the eCCA at 318 indicates that the unlicensed carrier is idle. If the eCCA at 318 indicates that the unlicensed carrier is idle, flow may once again pass from 308 to 310. If the eCCA at 318 indicates that the unlicensed carrier is not idle, flow may pass from 308 back to 304. The embodiments are not limited in this context.

Figure 4:
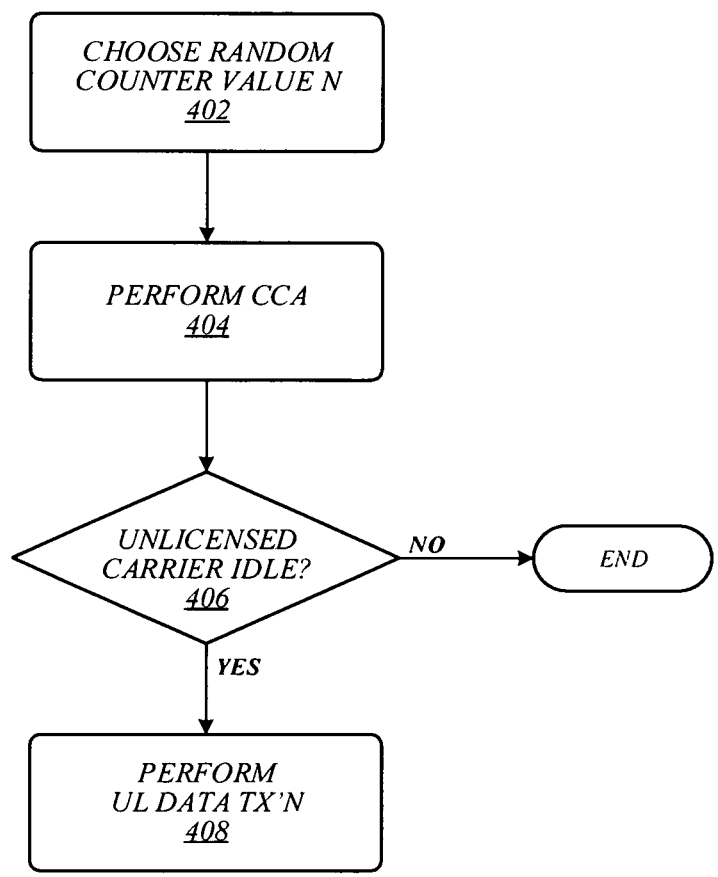
FIG. 4 illustrates an embodiment of a third logic flow.

FIG. 4 illustrates an example of a logic flow 400 that may be representative of a UL LBT procedure that may be implemented in various embodiments in order to account for timing constraints that may be associated with LTE-based uplink data transmission over an unlicensed carrier, such as an LTE-U carrier. For example, logic flow 400 may be representative of a UL LBT procedure that may be performed by LTE-U UE 104 of FIG. 1 following receipt of a UL grant indicating that resources of a particular subframe have been allocated for a UL transmission of UL data 108 to LTE-U eNB 102. As shown in logic flow 400, a random counter value N may be chosen at 402. At 404, a CCA may be performed. Following the CCA at 404, flow may pass to 406, and may then proceed from 406 in a manner depending on whether the CCA at 404 indicates that the unlicensed carrier is idle. If the CCA indicates that the unlicensed carrier is not idle, the logic flow may end. If the CCA indicates that the unlicensed carrier is idle, flow may proceed to 408, where the UL data transmission may be performed during the subframe comprising the allocated resources for the UL data transmission. The embodiments are not limited in this context.

In some embodiments, the counter value N may be randomly selected from among a range of positive integers 1 to q, where q is a value chosen from among a set of positive integers ranging from 4 to 32. In various embodiments, a maximum channel occupancy time for the unlicensed carrier may be defined as a function of q. In some embodiments, for example, the maximum channel occupancy time may be defined to be equal to 13/32 ms multiplied by q. In various embodiments, LTE-U UE 104 of FIG. 1 may select q such that the maximum channel occupancy time equals the number of uplink subframes scheduled by each uplink grant. In some embodiments, for example, LTE-U UE 104 may select q as floor((32/13)*K), where K represents the number of scheduled subframes. In various embodiments in which multi-subframe scheduling is not allowed, K may always be equal to 1. In some embodiments, LTE-U eNB 102 may configure the values of K and/or q. In various embodiments, in order to align CCAs/eCCAs between scheduled UEs, LTE-U eNB 102 may select a common counter value N for each of the scheduled UEs, and the scheduled UEs may use that value rather than randomly selecting initial N values. In some embodiments, LTE-U UE 104 may randomly select a new initial N value each time it receives a new UL grant. In various embodiments, LTE-U UE 104 may maintain the N value until UL data is transmitted. In some other embodiments, LTE-U UE 104 may maintain only one back-off counter, the value of which may be refreshed only when it becomes zero. In various embodiments, LTE-U UE 104 may maintain a separate back-off counter for each HARQ process. In some such embodiments, the value of each such back-off counter may be refreshed only when it becomes zero. The embodiments are not limited in this context.

Figure 5:
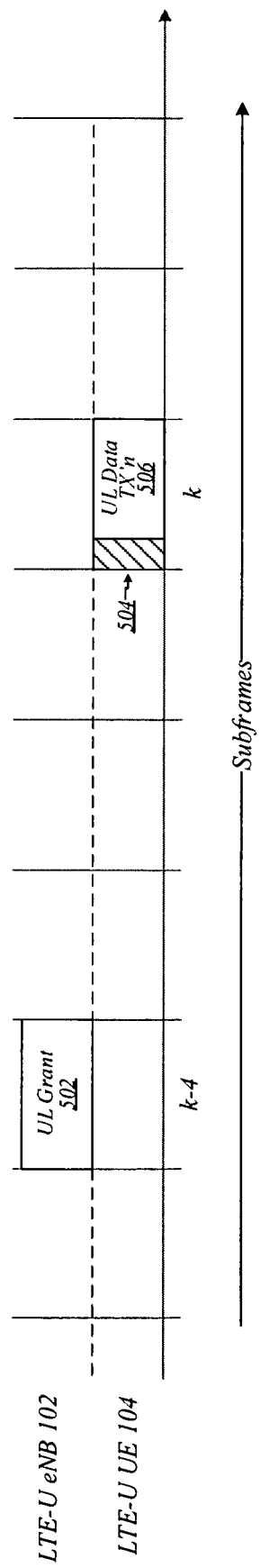
FIG. 5 illustrates an embodiment of a first communications timing diagram.

FIG. 5 illustrates an example of a communications timing diagram 500 that may be representative of various embodiments. More particularly, communications timing diagram 500 may be representative of some embodiments in which a UL LBT procedure for UL transmission during a given subframe is performed during an initial portion of that subframe. As shown in FIG. 5, LTE-U eNB 102 may transmit a UL grant 502 to LTE-U UE 104 during subframe k−4. In various embodiments, the UL grant 502 may comprise an indication that resources of an unlicensed carrier, such as an LTE-U carrier, have been allocated for use by LTE-U UE 104 during subframe k to perform UL transmission to LTE-U eNB 102. In some embodiments, following receipt of UL grant 502, LTE-U UE 104 may identify subframe k as a transmit is subframe comprising a subframe during which it has been allocated resources of an unlicensed carrier for the purpose of UL transmission.

In various embodiments, LTE-U UE 104 may identify an LBT interval 504 for subframe k. As shown in FIG. 5, the LBT interval 504 for subframe k may comprise an initial portion of subframe k. In some embodiments, LBT interval 504 may generally comprise a time interval during which LTE-U UE 104 is to perform a UL LBT procedure to confirm that the unlicensed carrier is idle if it is to perform UL transmission over the unlicensed carrier during subframe k. In various embodiments, LBT interval 504 may comprise a duration of one of more OFDM symbols. In some such embodiments, the one or more OFDM symbols may be punctured in order to accommodate the UL LBT procedure. In various embodiments, whether one or more initial OFDM symbols of subframe k are punctured may be predefined or may be configured by LTE-U eNB 102 via RRC/MAC/PHY signaling. In some embodiments, if the UL LBT procedure that it performs during LBT interval 504 indicates that the unlicensed carrier is idle, LTE-U UE 104 may perform a UL data transmission 506 over the unlicensed carrier following LBT interval 504. In various embodiments, if the UL LBT procedure that it performs during LBT interval 504 indicates that the unlicensed carrier is not idle, LTE-U UE 104 may refrain from transmission over the unlicensed carrier during subframe k. The embodiments are not limited in this context.

Figure 6:
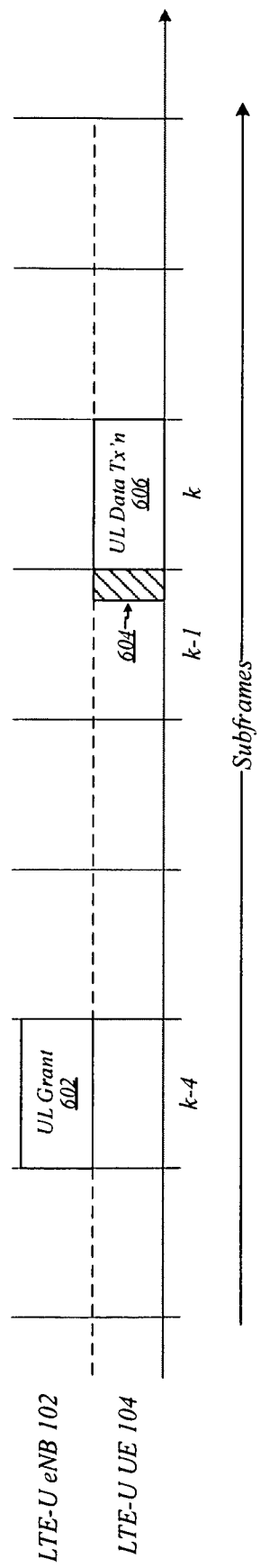
FIG. 6 illustrates an embodiment of a second communications timing diagram.

FIG. 6 illustrates an example of a communications timing diagram 600 that may be representative of some embodiments. More particularly, communications timing diagram 600 may be representative of various embodiments in which a UL LBT procedure for UL transmission during a given subframe is performed during a concluding portion of an immediately previous subframe. As shown in FIG. 6, LTE-U eNB 102 may transmit a UL grant 602 to LTE-U UE 104 during subframe k−4. In some embodiments, the UL grant 602 may comprise an indication that resources of an unlicensed carrier, such as an LTE-U carrier, have been allocated for use by LTE-U UE 104 during subframe k to perform UL transmission to LTE-U eNB 102. In various embodiments, following receipt of UL grant 602, LTE-U UE 104 may identify subframe k as a transmit subframe comprising a subframe during which it has been allocated resources of an unlicensed carrier for the purpose of UL transmission.

In some embodiments, LTE-U UE 104 may identify an LBT interval 604 for subframe k. As shown in FIG. 6, the LBT interval 604 for subframe k may comprise a concluding portion of an immediately preceding subframe k−1. In various embodiments, LBT interval 604 may generally comprise a time interval during which LTE-U UE 104 is to perform a UL LBT procedure to confirm that the unlicensed carrier is idle if it is to perform UL transmission over the unlicensed carrier during subframe k. In some embodiments, LBT interval 604 may comprise a duration of one of more OFDM symbols. In various such embodiments, the one or more OFDM symbols may be punctured in order to accommodate the UL LBT procedure. In some embodiments, whether one or more concluding OFDM symbols of subframe k−1 are punctured may be predefined or may be configured by LTE-U eNB 102 via RRC/MAC/PHY signaling. In various embodiments, if the UL LBT procedure that it performs during LBT interval 604 indicates that the unlicensed carrier is idle, LTE-U UE 104 may perform a UL data transmission 606 over the unlicensed carrier during subframe k. In some embodiments, if the UL LBT procedure that it performs during LBT interval 604 indicates that the unlicensed carrier is not idle, LTE-U UE 104 may refrain from transmission over the unlicensed carrier during subframe k. The embodiments are not limited in this context.

Figure 7:
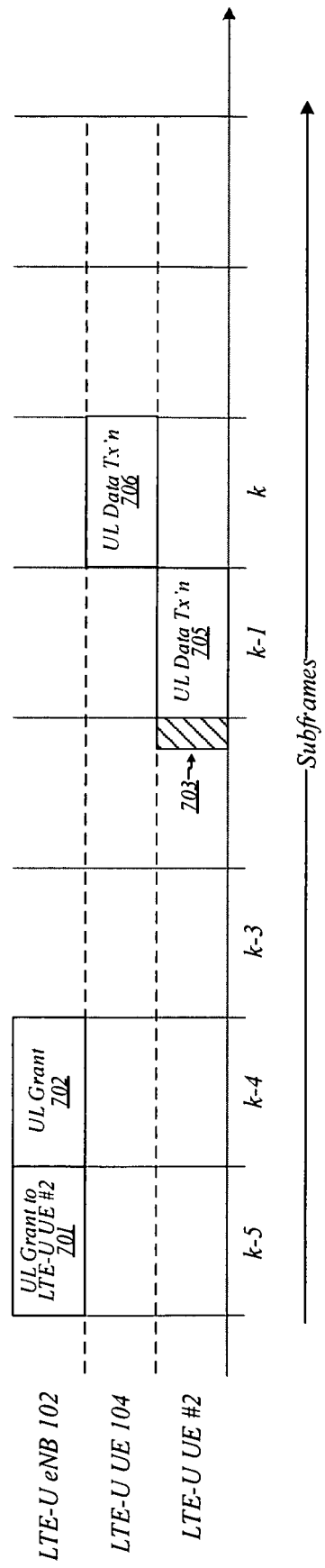
FIG. 7 illustrates an embodiment of a third communications timing diagram.

FIG. 7 illustrates an example of a communications timing diagram 700 that may be representative of various embodiments. More particularly, communications timing diagram 700 may be representative of some embodiments in which the UL LBT procedures for transmit subframes are performed during concluding portions of their immediately preceding subframes and LTE-U eNB 102 allocates respective unlicensed carrier resources of two successive subframes to two different LTE-U UEs. As shown in FIG. 7, LTE-U eNB 102 may send a UL grant 701 to LTE-U UE #2 during subframe k−5. In various embodiments, based on receipt of UL grant 701, LTE-U UE #2 may identify subframe k−1 as a subframe during which it is authorized to perform UL transmission over the unlicensed carrier. In some embodiments, LTE-U UE #2 may identify an LBT interval 703 for subframe k−1 and may perform a UL LBT procedure during LBT interval 703, which may comprise a concluding portion of subframe k−2. In various embodiments, if the UL LBT procedure indicates that the unlicensed carrier is idle, LTE-U UE #2 may perform a UL data transmission 705 over the unlicensed carrier during subframe k−1.

In some embodiments, LTE-U eNB 102 may send a UL grant 702 to LTE-U UE 104 during subframe k−4. In various embodiments, based on receipt of UL grant 702, LTE-U UE 104 may identify subframe k as a subframe during which it is authorized to perform UL transmission over the unlicensed carrier. In some embodiments, if LTE-U UE 104 performs a UL LBT procedure during a concluding portion of subframe k−1, it may conclude that the unlicensed carrier is unavailable due to the ongoing UL data transmission 705 of LTE-U UE #2. In such embodiments, LTE-U UE 104 may refrain from transmitting over the unlicensed carrier during subframe k, and thus the resources of subframe k may be wasted. As such, in various embodiments, LTE-U eNB 102 may configure UL grant 702 to comprise an indication that LTE-U UE 104 does not need to perform a UL LBT procedure to confirm availability of the unlicensed carrier before performing UL transmission over the unlicensed carrier during subframe k. In some embodiments, LTE-U eNB 102 may configure UL grant 702 to indicate that LTE-U UE 104 is not required to perform such a UL LBT procedure by setting an information element in UL grant 702 to a particular value. In various embodiments, based on a determination that UL grant 702 is not LBT-contingent, LTE-U UE 104 may refrain from performing a UL LBT procedure during a concluding portion of subframe k−1 and may perform UL data transmission 706 over the unlicensed carrier during subframe k. The embodiments are not limited in this context.

Figure 8:
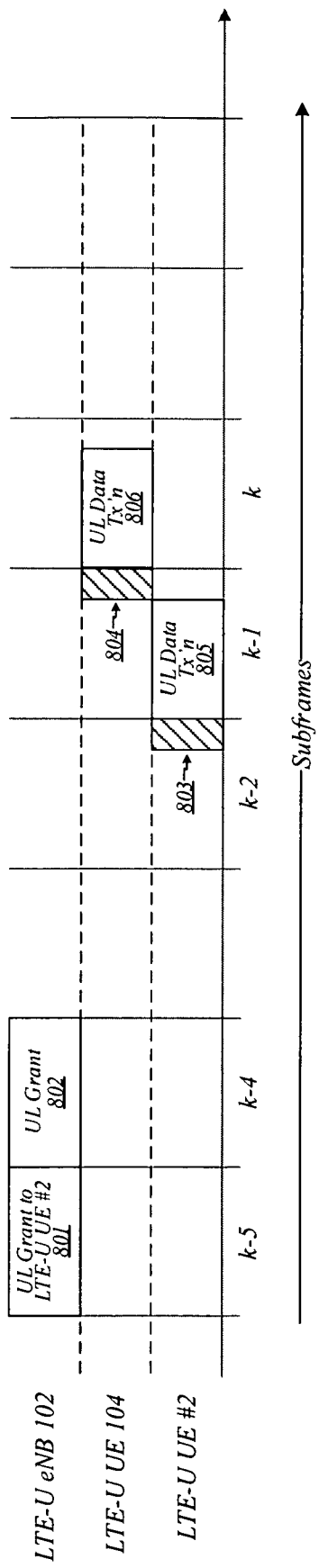
FIG. 8 illustrates an embodiment of a fourth communications timing diagram.

FIG. 8 illustrates an example of a communications timing diagram 800 that may be representative of some embodiments. More particularly, communications timing diagram 800 may be representative of various embodiments in which the UL LBT procedures for transmit subframes are performed during concluding portions of their immediately preceding subframes and LTE-U eNB 102 allocates respective unlicensed carrier resources of two successive subframes to two different LTE-U UEs. As shown in FIG. 8, LTE-U eNB 102 may send a UL grant 801 to LTE-U UE #2 during subframe k−5. In some embodiments, based on receipt of UL grant 801, LTE-U UE #2 may identify subframe k−1 as a subframe during which it is authorized to perform UL transmission over the unlicensed carrier. In various embodiments, LTE-U UE #2 may identify an LBT interval 803 for subframe k−1 and may perform a UL LBT procedure during LBT interval 803, which may comprise a concluding portion of subframe k−2. In some embodiments, if the UL LBT procedure indicates that the unlicensed carrier is idle, LTE-U UE #2 may perform a UL data transmission 805 over the unlicensed carrier during subframe k−1.

In various embodiments, LTE-U eNB 102 may send a UL grant 802 to LTE-U UE 104 during subframe k−4. In some embodiments, based on receipt of UL grant 802, LTE-U UE 104 may identify subframe k as a subframe during which it is authorized to perform UL transmission over the unlicensed carrier. In various embodiments, LTE-U UE 104 may identify an LBT interval 804 for subframe k and may perform a UL LBT procedure during LBT interval 804, which may comprise a concluding portion of subframe k−1. In some embodiments, if UL data transmission 805 is still ongoing during LBT interval 804, LTE-U UE 104 may conclude that the unlicensed carrier is unavailable and refrain from UL transmission over the unlicensed carrier during subframe k, resulting in waste of resources of subframe k. As such, in various embodiments, LTE-U eNB 102 may configure one or more punctured OFDM symbols at the end of subframe k−1 to accommodate the performance of the UL LBT procedure by LTE-U UE 104 during LBT interval 804. In some embodiments, LTE-U UE 104 may perform a UL LBT procedure during LBT interval 804, determine that the unlicensed carrier is available, and perform a UL data transmission 806 over the unlicensed carrier during subframe k. The embodiments are not limited in this context.

Figure 9:
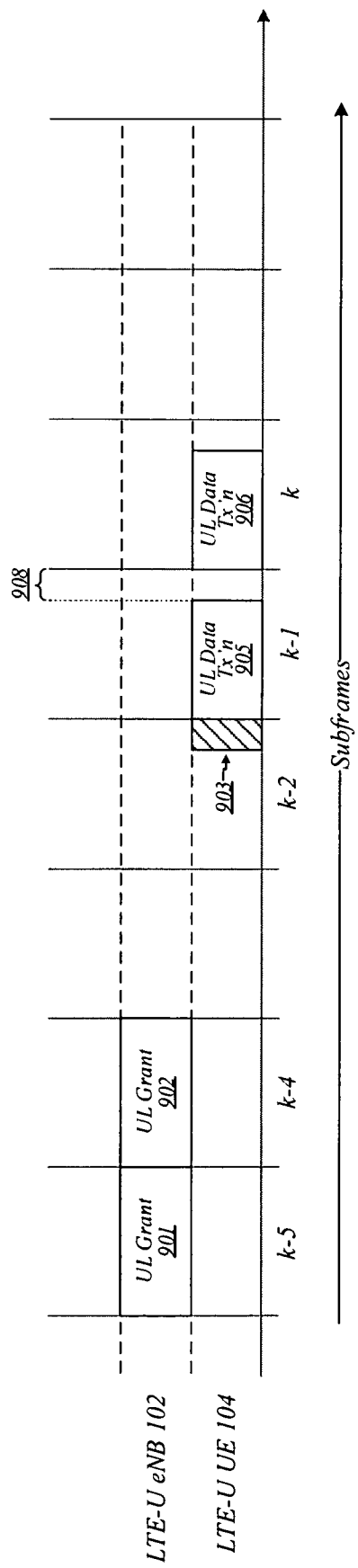
FIG. 9 illustrates an embodiment of a fifth communications timing diagram.

FIG. 9 illustrates an example of a communications timing diagram 900 that may be representative of various embodiments. More particularly, communications timing diagram 900 may be representative of some embodiments in which the UL LBT procedures for transmit subframes are performed during concluding portions of their immediately preceding subframes and LTE-U eNB 102 allocates respective unlicensed carrier resources of both of two successive subframes to LTE-U UE 104. As shown in FIG. 9, LTE-U eNB 102 may send a UL grant 901 to LTE-U UE 104 during subframe k−5 and may send a UL grant 902 to LTE-U UE 104 during subframe k−4. In various embodiments, based on receipt of UL grant 901, LTE-U UE 104 may identify subframe k−1 as a subframe during which it is authorized to perform UL transmission over the unlicensed carrier. In some embodiments, LTE-U UE 104 may identify an LBT interval 903 for subframe k−1 and may perform a UL LBT procedure during LBT interval 903, which may comprise a concluding portion of subframe k−2. In various embodiments, if the UL LBT procedure indicates that the unlicensed carrier is idle, LTE-U UE 104 may perform UL data transmission 905 over the unlicensed carrier during subframe k−1.

In some embodiments, based on receipt of UL grant 902, LTE-U UE 104 may identify subframe k as a subframe during which it is authorized to perform UL transmission over the unlicensed carrier. In various embodiments, LTE-U UE 104 may identify an LBT interval 908 for subframe k, and the LBT interval 908 may comprise a concluding portion of subframe k−1. In some embodiments, if LTE-U UE 104 has already confirmed the availability of the unlicensed carrier during LBT interval 903 and performed UL transmission during subframe k−1, it may be unnecessary for LTE-U UE 104 to perform a UL LBT procedure during LBT interval 908. As such, in various embodiments, LTE-U UE 104 may perform a UL data transmission 906 over the unlicensed carrier during subframe k without performing a UL LBT procedure during LBT interval 908. In some embodiments, one or more other devices may need to perform UL LBT procedures for the unlicensed carrier during LBT interval 908, and thus LTE-U UE 104 may need to refrain from transmission over the unlicensed carrier during UL LBT interval 908. In various other embodiments, if no devices need to perform UL LBT procedures for the unlicensed carrier during LBT interval 908, then it may be desirable that LTE-U UE 104 use resources of the unlicensed carrier to perform UL transmission during LBT interval 908 as well. In some embodiments, LTE-U eNB 102 may configure either or both of UL grants 901 and 902 to indicate whether LTE-U UE 104 may perform UL transmission over the unlicensed carrier during LBT interval 908. The embodiments are not limited in this context.

Figure 10:
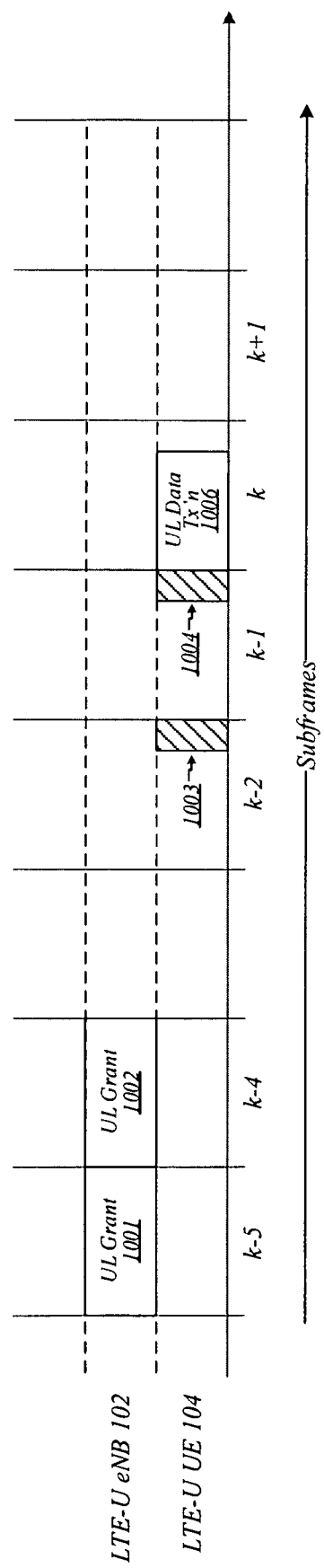
FIG. 10 illustrates an embodiment of a sixth communications timing diagram.

FIG. 10 illustrates an example of a communications timing diagram 1000 that may be representative of various embodiments. More particularly, communications timing diagram 1000 may be representative of some embodiments in which the UL LBT procedures for transmit subframes are performed during concluding portions of their immediately preceding subframes, LTE-U eNB 102 allocates respective unlicensed carrier resources of both of two successive subframes to LTE-U UE 104, and the unlicensed carrier is determined to be unavailable during a UL LBT procedure for the first of those two subframes. As shown in FIG. 10, LTE-U eNB 102 may send a UL grant 1001 to LTE-U UE 104 during subframe k−5 and may send a UL grant 1002 to LTE-U UE 104 during subframe k−4. In various embodiments, based on receipt of UL grant 1001, LTE-U UE 104 may identify subframe k−1 as a subframe during which it is authorized to perform UL transmission over the unlicensed carrier. In some embodiments, LTE-U UE 104 may identify an LBT interval 1003 for subframe k−1 and may perform a UL LBT procedure during LBT interval 1003, which may comprise a concluding portion of subframe k−2. In various embodiments, the UL LBT procedure performed during LBT interval 1003 may indicate that the unlicensed carrier is unavailable, and LTE-U UE 104 may refrain from transmission over the unlicensed carrier during subframe k−1.

In some embodiments, based on receipt of UL grant 1002, LTE-U UE 104 may identify subframe k as a subframe during which it is authorized to perform UL transmission over the unlicensed carrier. In various embodiments, LTE-U UE 104 may identify an LBT interval 1004 for subframe k, and the LBT interval 1004 may comprise a concluding portion of subframe k−1. In some embodiments, based on the UL LBT procedure performed during LBT interval 1003 having resulted in a conclusion that the unlicensed carrier was unavailable, LTE-U UE 104 may determine that it needs to perform a UL LBT procedure for subframe k during LBT interval 1004. In various embodiments, LTE-U UE 104 may perform that UL LBT procedure during LBT interval 1004, and may determine that the unlicensed carrier has become available. In some embodiments, in response to this determination, LTE-U UE 104 may perform UL data transmission 1006 over the unlicensed carrier during subframe k. The embodiments are not limited in this context.

Figure 11:
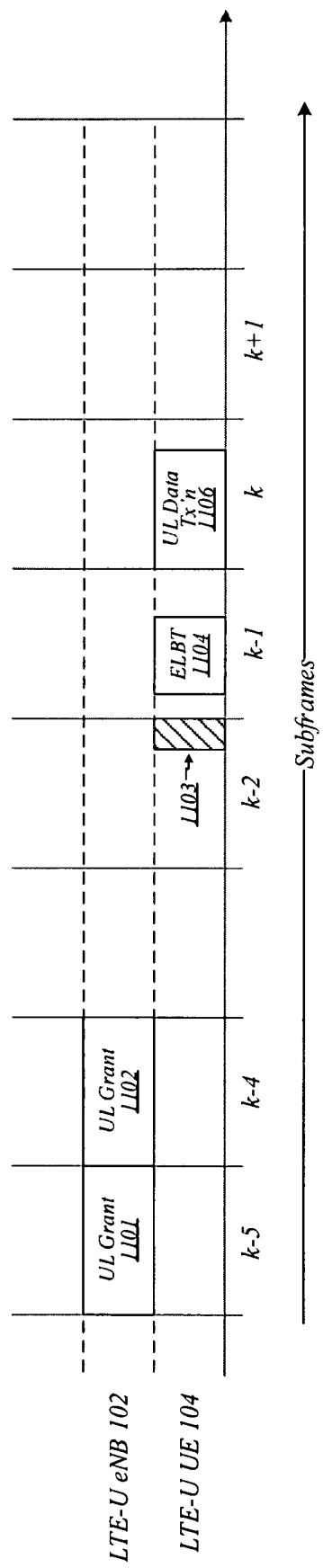
FIG. 11 illustrates an embodiment of a seventh communications timing diagram.

FIG. 11 illustrates an example of a communications timing diagram 1100 that may be representative of various embodiments. More particularly, communications timing diagram 1000 may be representative of some embodiments in which the UL LBT procedures for transmit subframes are performed during concluding portions of their immediately preceding subframes, LTE-U eNB 102 allocates respective unlicensed carrier resources of both of two successive subframes to LTE-U UE 104, and the unlicensed carrier is determined to be unavailable during a UL LBT procedure for the first of those two subframes. As shown in FIG. 11, LTE-U eNB 102 may send a UL grant 1101 to LTE-U UE 104 during subframe k−5 and may send a UL grant 1102 to LTE-U UE 104 during subframe k−4. In various embodiments, based on receipt of UL grant 1101, LTE-U UE 104 may identify subframe k−1 as a subframe during which it is authorized to perform UL transmission over the unlicensed carrier. In some embodiments, LTE-U UE 104 may identify an LBT interval 1103 for subframe k−1 and may perform a UL LBT procedure during LBT interval 1103, which may comprise a concluding portion of subframe k−2. In various embodiments, the UL LBT procedure performed during LBT interval 1103 may indicate that the unlicensed carrier is unavailable, and LTE-U UE 104 may refrain from transmission over the unlicensed carrier during subframe k−1.

In some embodiments, based on receipt of UL grant 1102, LTE-U UE 104 may identify subframe k as a subframe during which it is authorized to perform UL transmission over the unlicensed carrier. In various embodiments, based on the UL LBT procedure performed during LBT interval 1103 having resulted in a conclusion that the unlicensed carrier was unavailable, LTE-U UE 104 may determine that it needs to perform a UL extended LBT (ELBT) procedure 1104 for subframe k during subframe k−1. In some embodiments, the UL ELBT procedure 1104 may comprise one or more extended CCAs (ECCAs). In various embodiments, LTE-U UE 104 may perform the UL ELBT procedure 1104 during subframe k−1 and may determine that the unlicensed carrier has become available. In some embodiments, in response to this determination, LTE-U UE 104 may perform UL data transmission 1106 over the unlicensed carrier during subframe k. The embodiments are not limited in this context.

Operations for the above embodiments may be further described with reference to the following figures and accompanying examples. Some of the figures may include a logic flow. Although such figures presented herein may include a particular logic flow, it can be appreciated that the logic flow merely provides an example of how the general functionality as described herein can be implemented. Further, the given logic flow does not necessarily have to be executed in the order presented unless otherwise indicated. In addition, the given logic flow may be implemented by a hardware element, a software element executed by a processor, or any combination thereof. The embodiments are not limited in this context.

Figure 12:
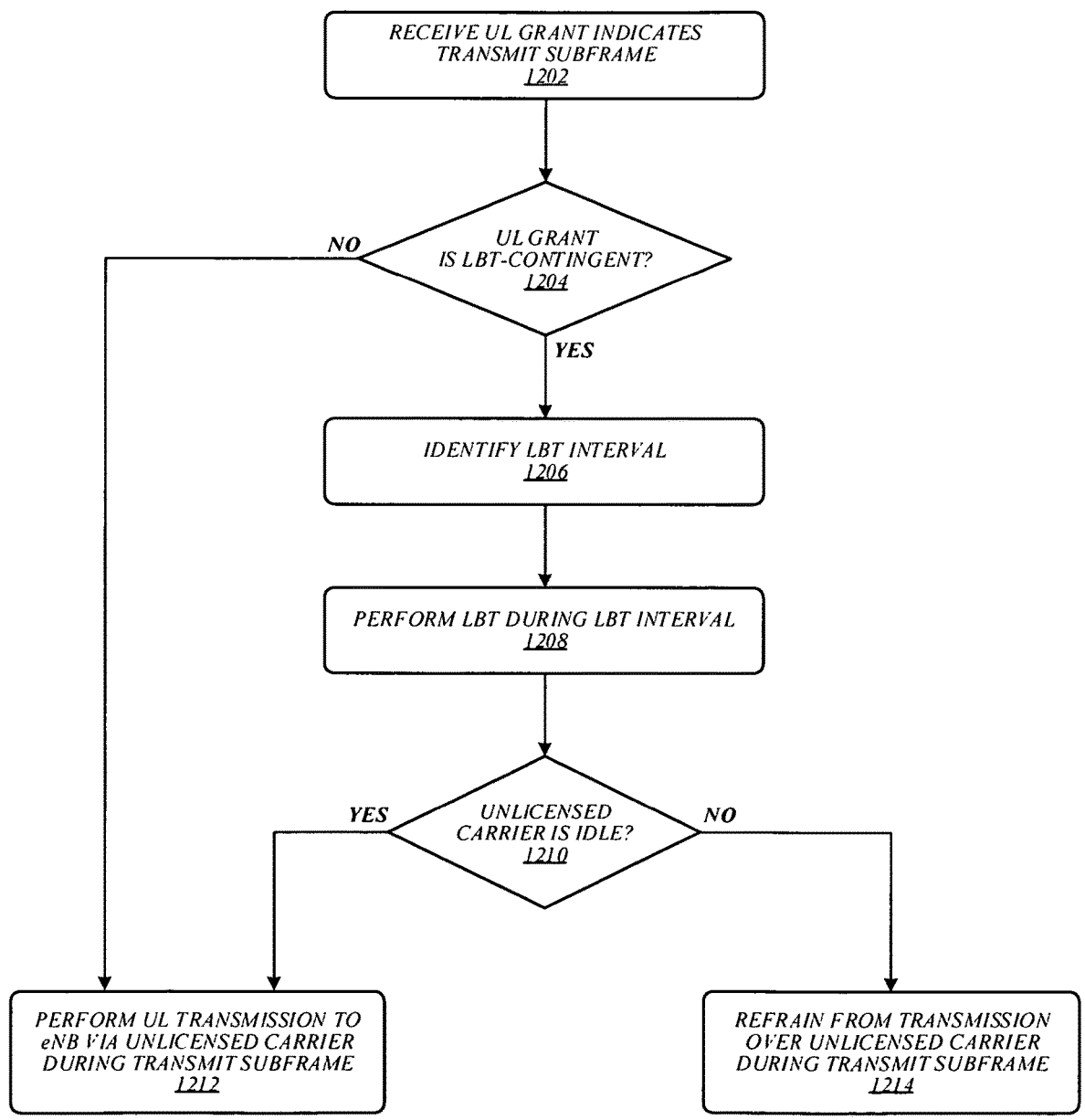
FIG. 12 illustrates an embodiment of a fourth logic flow.

FIG. 12 illustrates an example of a logic flow 1200 that may be representative of the implementation of one or more of the disclosed carrier-sensing techniques for LTE-based transmissions over unlicensed carriers according to various embodiments. For example, logic flow 1200 may be representative of operations that may be performed in some embodiments by LTE-U UE 104. As shown in FIG. 12, a UL grant may be received at 1202 that indicates a transmit subframe, which may comprise a subframe during which a UE is authorized to perform UL transmission via an unlicensed carrier, such as an LTE-U carrier. For example, LTE-U UE 104 may receive UL grant 702 of FIG. 7 or UL grant 802 of FIG. 8. At 1204, it may be determined whether the UL grant is LBT-contingent, such that a UL LBT procedure needs to be performed to confirm the availability of the unlicensed carrier prior to initiating UL transmission over the unlicensed carrier during the transmit subframe. If it is determined at 1204 that the UL grant is not LBT-contingent, flow may pass to 1212, where UL transmission to an eNB via the unlicensed carrier may be performed during the transmit subframe. For example, in response to a determination that UL grant 702 of FIG. 7 is not LBT-contingent, LTE-U UE 104 may perform UL data transmission 706 over the unlicensed carrier during subframe k without performing a UL LBT procedure during subframe k−1.

If it is determined at 1204 that the UL grant is LBT-contingent, flow may pass to 1206, where an LBT interval may be identified. For example, LTE-U UE 104 may determine that UL grant 802 of FIG. 8 is LBT-contingent, and may identify LBT interval 804. At 1208, an LBT procedure may be performed during the LBT interval. For example, LTE-U UE 104 may perform a UL LBT procedure during LBT interval 804. Following the LBT procedure at 1208, flow may pass to 1210, and may then proceed in a manner depending on whether the LBT procedure at 1208 indicates that the unlicensed carrier is idle. If the LBT procedure performed at 1208 indicates that the unlicensed carrier is idle, flow may pass to 1212, where UL transmission to an eNB via the unlicensed carrier may be performed during the transmit subframe. For example, in response to a determination via a UL LBT performed during LBT interval 804 of FIG. 8 that an unlicensed carrier is idle, LTE-U UE 104 may perform UL data transmission 806 over the unlicensed carrier during subframe k. If the LBT procedure performed at 1208 indicates that the unlicensed carrier is not idle, flow may pass to 1214, where transmission over the unlicensed carrier may be refrained from during the transmit subframe. For example, in response to a determination via a UL LBT performed during LBT interval 804 of FIG. 8 that an unlicensed carrier is not idle, LTE-U UE 104 may refrain from transmission over the unlicensed carrier during subframe k. The embodiments are not limited to these examples.

Figure 13:
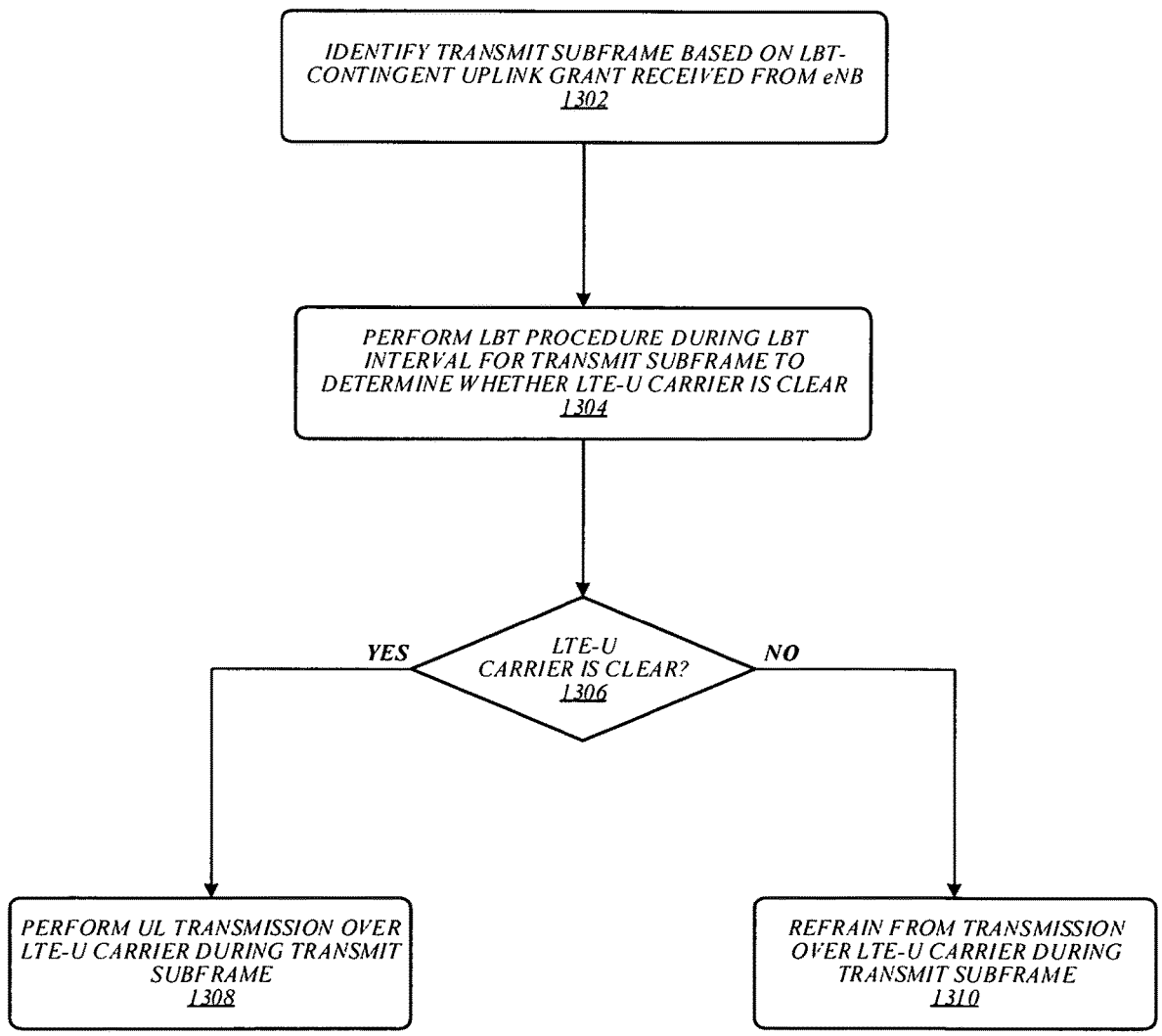
FIG. 13 illustrates an embodiment of a fifth logic flow.

FIG. 13 illustrates an example of a logic flow 1300 that may be representative of the implementation of one or more of the disclosed carrier-sensing techniques for LTE-based transmissions over unlicensed carriers according to various embodiments. For example, logic flow 1300 may be representative of operations that may be performed in some embodiments by LTE-U UE 104. As shown in FIG. 13, a transmit subframe may be identified at 1302 based on an LBT-contingent uplink grant received from an eNB. For example, based on UL grant 602 of FIG. 6, LTE-U UE 104 may identify subframe k as a transmit subframe comprising a subframe during which it is authorized to perform UL transmission over an LTE-U carrier. At 1304, an LBT procedure may be performed during an LBT interval for the transmit subframe to determine whether the LTE-U carrier is clear. For example, LTE-U UE 104 may perform an LBT procedure during LBT interval 604 of FIG. 6 to determine whether the LTE-U carrier is clear.

If it is determined at 1306 that the LTE-U carrier is clear, flow may pass to 1308, where UL transmission may be performed over the LTE-U carrier during the transmit subframe. For example, following a determination during LBT interval 604 of FIG. 6 that the LTE-U carrier is clear, LTE-U UE 104 may perform UL data transmission 606 over the LTE-U carrier during subframe k. If it is determined at 1306 that the LTE-U carrier is not clear, flow may pass to 1310, where transmission over the LTE-U carrier may be refrained from during the transmit subframe. For example, following a determination during LBT interval 604 of FIG. 6 that the LTE-U carrier is not clear, LTE-U UE 104 may refrain from transmission over the LTE-U carrier during subframe k. The embodiments are not limited to these examples.

Figure 14:
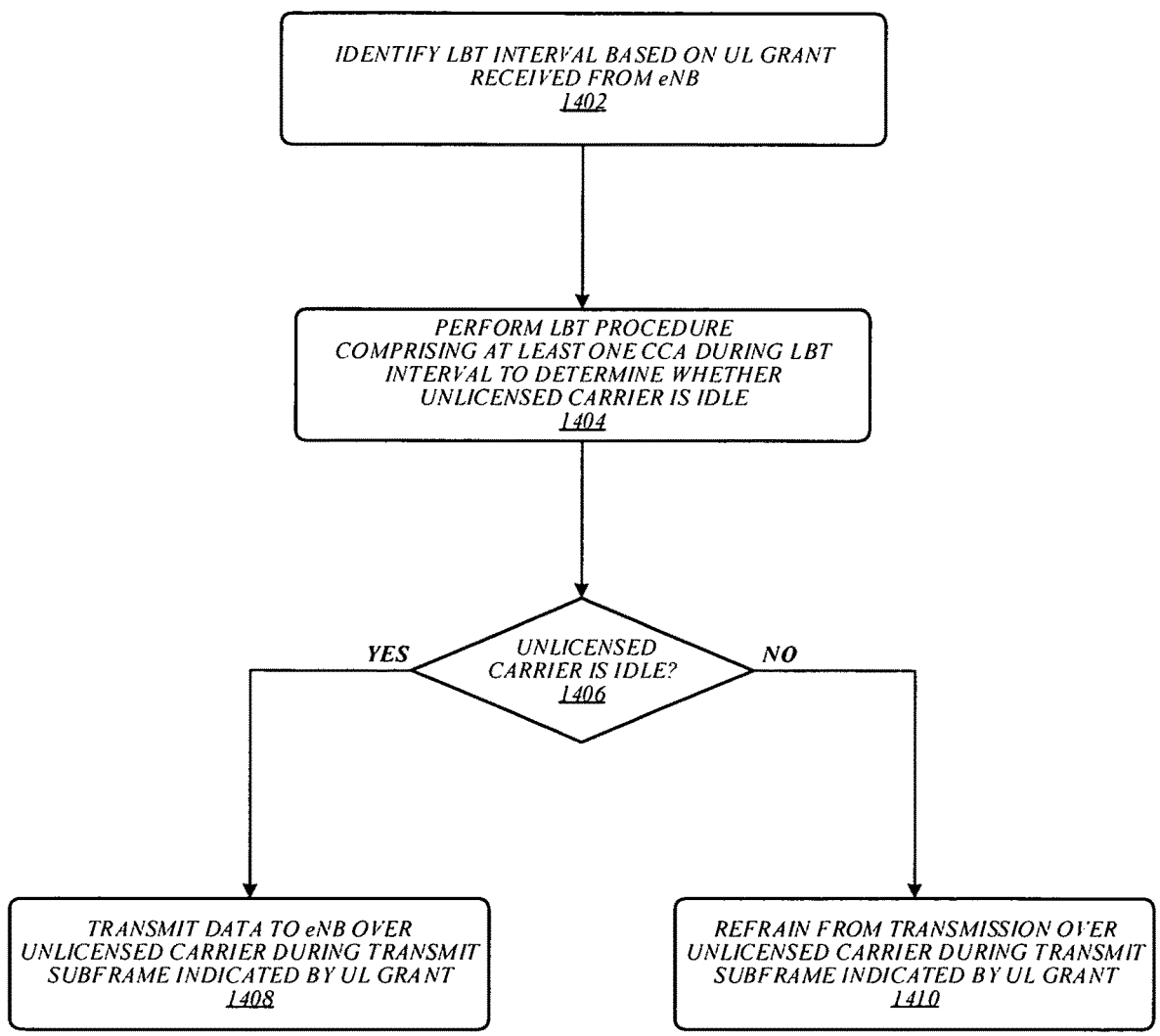
FIG. 14 illustrates an embodiment of a sixth logic flow.

FIG. 14 illustrates an example of a logic flow 1400 that may be representative of the implementation of one or more of the disclosed carrier-sensing techniques for LTE-based transmissions over unlicensed carriers according to various embodiments. For example, logic flow 1400 may be representative of operations that may be performed in some embodiments by LTE-U UE 104. As shown in FIG. 14, an LBT interval may be identified at 1402 based on a UL grant received from an eNB. For example, LTE-U UE 104 may identify LBT interval 604 of FIG. 6 based on a UL grant 602 received from LTE-U eNB 102. At 1404, an LBT procedure comprising at least one CCA may be performed during the LBT interval to determine whether an unlicensed carrier is idle. For example, LTE-U UE 104 may perform an LBT procedure comprising at least one CCA during LBT interval 604 of FIG. 6 in order to determine whether an unlicensed carrier is idle.

If it is determined at 1406 that the unlicensed carrier is idle, flow may pass to 1408, where data may be transmitted to the eNB over the unlicensed carrier during a transmit subframe indicated by the UL grant. For example, following a determination during LBT interval 604 of FIG. 6 that the unlicensed carrier is idle, LTE-U UE 104 may perform UL data transmission 606 to transmit data to LTE-U eNB 102 over the unlicensed carrier during subframe k. If it is determined at 1406 that the unlicensed carrier is not idle, flow may pass to 1410, where transmission over the unlicensed carrier may be refrained from during the transmit subframe indicated by the UL grant. For example, following a determination during LBT interval 604 of FIG. 6 that the unlicensed carrier is not idle, LTE-U UE 104 may refrain from transmission over the unlicensed carrier during subframe k. The embodiments are not limited to these examples.

Figure 15:
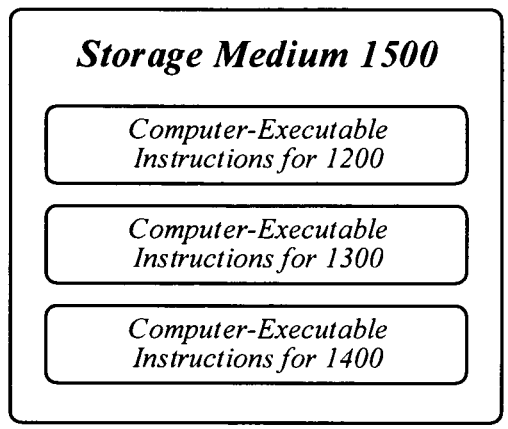
FIG. 15 illustrates an embodiment of a storage medium.

FIG. 15 illustrates an embodiment of a storage medium 1500. Storage medium 1500 may comprise any non-transitory computer-readable storage medium or machine-readable storage medium, such as an optical, magnetic or semiconductor storage medium. In various embodiments, storage medium 1500 may comprise an article of manufacture. In some embodiments, storage medium 1500 may store computer-executable instructions, such as computer-executable instructions to implement one or more of logic flow 1200 of FIG. 12, logic flow 1300 of FIG. 13, and logic flow 1400 of FIG. 14. Examples of a computer-readable storage medium or machine-readable storage medium may include any tangible media capable of storing electronic data, including volatile memory or non-volatile memory, removable or non-removable memory, erasable or non-erasable memory, writeable or re-writeable memory, and so forth. Examples of computer-executable instructions may include any suitable type of code, such as source code, compiled code, interpreted code, executable code, static code, dynamic code, object-oriented code, visual code, and the like. The embodiments are not limited in this context.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware. Embodiments described herein may be implemented into a system using any suitably configured hardware and/or software.

Figure 16:
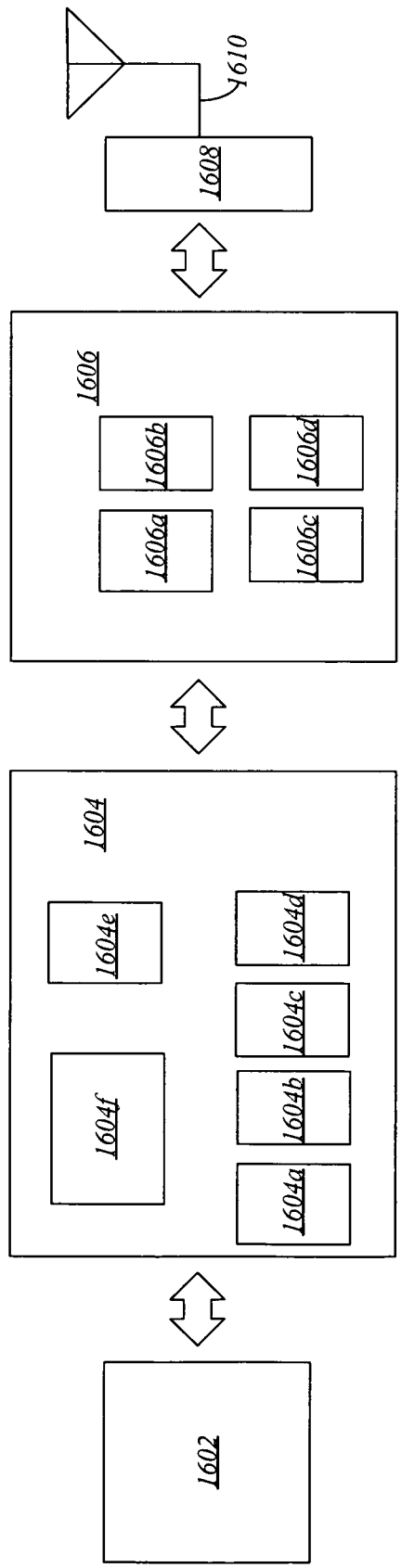
FIG. 16 illustrates an embodiment of a first device.

FIG. 16 illustrates an example of a UE device 1600 that may be representative of a UE that implements one or more of the disclosed techniques in various embodiments. For example, UE device 1600 may be representative of LTE-U UE 104 according to some embodiments. In some embodiments, the UE device 1600 may include application circuitry 1602, baseband circuitry 1604, Radio Frequency (RF) circuitry 1606, front-end module (FEM) circuitry 1608 and one or more antennas 1610, coupled together at least as shown.

The application circuitry 1602 may include one or more application processors. For example, the application circuitry 1602 may include circuitry such as, but not limited to, one or more single-core or multi-core processors. The processor(s) may include any combination of general-purpose processors and dedicated processors (e.g., graphics processors, application processors, etc.). The processors may be coupled with and/or may include memory/storage and may be configured to execute instructions stored in the memory/storage to enable various applications and/or operating systems to run on the system.

The baseband circuitry 1604 may include circuitry such as, but not limited to, one or more single-core or multi-core processors. The baseband circuitry 1604 may include one or more baseband processors and/or control logic to process baseband signals received from a receive signal path of the RF circuitry 1606 and to generate baseband signals for a transmit signal path of the RF circuitry 1606. Baseband processing circuitry 1604 may interface with the application circuitry 1602 for generation and processing of the baseband signals and for controlling operations of the RF circuitry 1606. For example, in some embodiments, the baseband circuitry 1604 may include a second generation (2G) baseband processor 1604*a*, third generation (3G) baseband processor 1604*b*, fourth generation (4G) baseband processor 1604*c*, and/or other baseband processor(s) 1604*d* for other existing generations, generations in development or to be developed in the future (e.g., fifth generation (5G), 6G, etc.). The baseband circuitry 1604 (e.g., one or more of baseband processors 1604*a-d*) may handle various radio control functions that enable communication with one or more radio networks via the RF circuitry 1606. The radio control functions may include, but are not limited to, signal modulation/demodulation, encoding/decoding, radio frequency shifting, etc. In some embodiments, modulation/demodulation circuitry of the baseband circuitry 1604 may include Fast-Fourier Transform (FFT), precoding, and/or constellation mapping/demapping functionality. In some embodiments, encoding/decoding circuitry of the baseband circuitry 1604 may include convolution, tail-biting convolution, turbo, Viterbi, and/or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 1604 may include elements of a protocol stack such as, for example, elements of an evolved universal terrestrial radio access network (EUTRAN) protocol including, for example, physical (PHY), media access control (MAC), radio link control (RLC), packet data convergence protocol (PDCP), and/or radio resource control (RRC) elements. A central processing unit (CPU) 1604e of the baseband circuitry 1604 may be configured to run elements of the protocol stack for signaling of the PHY, MAC, RLC, PDCP and/or RRC layers. In some embodiments, the baseband circuitry may include one or more audio digital signal processor(s) (DSP) 1604f. The audio DSP(s) 1604f may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 1604 and the application circuitry 1602 may be implemented together such as, for example, on a system on a chip (SOC).

In some embodiments, the baseband circuitry 1604 may provide for communication compatible with one or more radio technologies. For example, in some embodiments, the baseband circuitry 1604 may support communication with an evolved universal terrestrial radio access network (EUTRAN) and/or other wireless metropolitan area networks (WMAN), a wireless local area network (WLAN), a wireless personal area network (WPAN). Embodiments in which the baseband circuitry 1604 is configured to support radio communications of more than one wireless protocol may be referred to as multi-mode baseband circuitry.

RF circuitry 1606 may enable communication with wireless networks using modulated electromagnetic radiation through a non-solid medium. In various embodiments, the RF circuitry 1606 may include switches, filters, amplifiers, etc. to facilitate the communication with the wireless network. RF circuitry 1606 may include a receive signal path which may include circuitry to down-convert RF signals received from the FEM circuitry 1608 and provide baseband signals to the baseband circuitry 1604. RF circuitry 1606 may also include a transmit signal path which may include circuitry to up-convert baseband signals provided by the baseband circuitry 1604 and provide RF output signals to the FEM circuitry 1608 for transmission.

In some embodiments, the RF circuitry 1606 may include a receive signal path and a transmit signal path. The receive signal path of the RF circuitry 1606 may include mixer circuitry 1606a, amplifier circuitry 1606b and filter circuitry 1606c. The transmit signal path of the RF circuitry 1606 may include filter circuitry 1606c and mixer circuitry 1606a. RF circuitry 1606 may also include synthesizer circuitry 1606d for synthesizing a frequency for use by the mixer circuitry 1606a of the receive signal path and the transmit signal path. In some embodiments, the mixer circuitry 1606a of the receive signal path may be configured to down-convert RF signals received from the FEM circuitry 1608 based on the synthesized frequency provided by synthesizer circuitry 1606d. The amplifier circuitry 1606b may be configured to amplify the down-converted signals and the filter circuitry 1606c may be a low-pass filter (LPF) or band-pass filter (BPF) configured to remove unwanted signals from the down-converted signals to generate output baseband signals. Output baseband signals may be provided to the baseband circuitry 1604 for further processing. In some embodiments, the output baseband signals may be zero-frequency baseband signals, although this is not a requirement. In some embodiments, mixer circuitry 1606a of the receive signal path may comprise passive mixers, although the scope of the embodiments is not limited in this respect.

In some embodiments, the mixer circuitry 1606a of the transmit signal path may be configured to up-convert input baseband signals based on the synthesized frequency provided by the synthesizer circuitry 1606d to generate RF output signals for the FEM circuitry 1608. The baseband signals may be provided by the baseband circuitry 1604 and may be filtered by filter circuitry 1606c. The filter circuitry 1606c may include a low-pass filter (LPF), although the scope of the embodiments is not limited in this respect.

In some embodiments, the mixer circuitry 1606a of the receive signal path and the mixer circuitry 1606a of the transmit signal path may include two or more mixers and may be arranged for quadrature downconversion and/or upconversion respectively. In some embodiments, the mixer circuitry 1606a of the receive signal path and the mixer circuitry 1606a of the transmit signal path may include two or more mixers and may be arranged for image rejection (e.g., Hartley image rejection). In some embodiments, the mixer circuitry 1606a of the receive signal path and the mixer circuitry 1606a may be arranged for direct downconversion and/or direct upconversion, respectively. In some embodiments, the mixer circuitry 1606a of the receive signal path and the mixer circuitry 1606a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 1606 may include analog-to-digital converter (ADC) and digital-to-analog converter (DAC) circuitry and the baseband circuitry 1604 may include a digital baseband interface to communicate with the RF circuitry 1606.

In some dual-mode embodiments, a separate radio IC circuitry may be provided for processing signals for each spectrum, although the scope of the embodiments is not limited in this respect.

In some embodiments, the synthesizer circuitry 1606d may be a fractional-N synthesizer or a fractional N/N+1 synthesizer, although the scope of the embodiments is not limited in this respect as other types of frequency synthesizers may be suitable. For example, synthesizer circuitry 1606d may be a delta-sigma synthesizer, a frequency multiplier, or a synthesizer comprising a phase-locked loop with a frequency divider.

The synthesizer circuitry 1606d may be configured to synthesize an output frequency for use by the mixer circuitry 1606a of the RF circuitry 1606 based on a frequency input and a divider control input. In some embodiments, the synthesizer circuitry 1606d may be a fractional N/N+1 synthesizer.

In some embodiments, frequency input may be provided by a voltage controlled oscillator (VCO), although that is not a requirement. Divider control input may be provided by either the baseband circuitry 1604 or the applications processor 1602 depending on the desired output frequency. In some embodiments, a divider control input (e.g., N) may be determined from a look-up table based on a channel indicated by the applications processor 1602.

Synthesizer circuitry 1606d of the RF circuitry 1606 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 1606d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 1606 may include an IQ/polar converter.

FEM circuitry 1608 may include a receive signal path which may include circuitry configured to operate on RF signals received from one or more antennas 1610, amplify the received signals and provide the amplified versions of the received signals to the RF circuitry 1606 for further processing. FEM circuitry 1608 may also include a transmit signal path which may include circuitry configured to amplify signals for transmission provided by the RF circuitry 1606 for transmission by one or more of the one or more antennas 1610.

In some embodiments, the FEM circuitry 1608 may include a TX/RX switch to switch between transmit mode and receive mode operation. The FEM circuitry may include a receive signal path and a transmit signal path. The receive signal path of the FEM circuitry may include a low-noise amplifier (LNA) to amplify received RF signals and provide the amplified received RF signals as an output (e.g., to the RF circuitry 1606). The transmit signal path of the FEM circuitry 1608 may include a power amplifier (PA) to amplify input RF signals (e.g., provided by RF circuitry 1606), and one or more filters to generate RF signals for subsequent transmission (e.g., by one or more of the one or more antennas 1610.

In some embodiments, the UE device 1600 may include additional elements such as, for example, memory/storage, display, camera, sensor, and/or input/output (I/O) interface.

Figure 17:
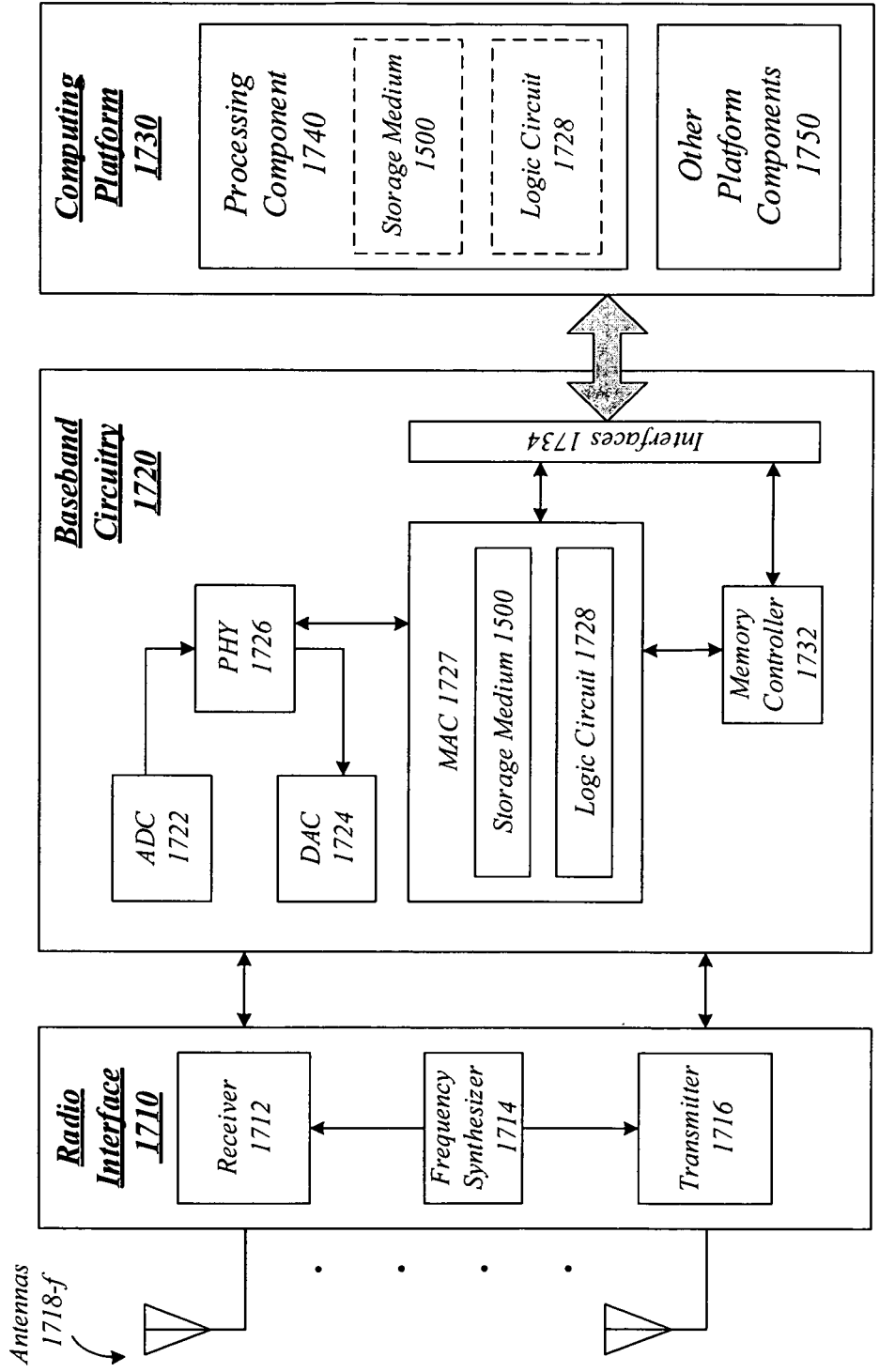
FIG. 17 illustrates an embodiment of a second device.

FIG. 17 illustrates an embodiment of a communications device 1700 that may implement one or more of LTE-U eNB 102, LTE-U UE 104, logic flow 1200 of FIG. 12, logic flow 1300 of FIG. 13, logic flow 1400 of FIG. 14, storage medium 1500 of FIG. 15, and UE 1600 of FIG. 16. In various embodiments, device 1700 may comprise a logic circuit 1728. The logic circuit 1728 may include physical circuits to perform operations described for one or more of LTE-U eNB 102, LTE-U UE 104, logic flow 1200 of FIG. 12, logic flow 1300 of FIG. 13, logic flow 1400 of FIG. 14, and UE 1600 of FIG. 16 for example. As shown in FIG. 17, device 1700 may include a radio interface 1710, baseband circuitry 1720, and computing platform 1730, although the embodiments are not limited to this configuration.

The device 1700 may implement some or all of the structure and/or operations for one or more of LTE-U eNB 102, LTE-U UE 104, logic flow 1200 of FIG. 12, logic flow 1300 of FIG. 13, logic flow 1400 of FIG. 14, storage medium 1500 of FIG. 15, UE 1600 of FIG. 16, and logic circuit 1728 in a single computing entity, such as entirely within a single device. Alternatively, the device 1700 may distribute portions of the structure and/or operations for one or more of LTE-U eNB 102, LTE-U UE 104, logic flow 1200 of FIG. 12, logic flow 1300 of FIG. 13, logic flow 1400 of FIG. 14, storage medium 1500 of FIG. 15, UE 1600 of FIG. 16, and logic circuit 1728 across multiple computing entities using a distributed system architecture, such as a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

In one embodiment, radio interface 1710 may include a component or combination of components adapted for transmitting and/or receiving single-carrier or multi-carrier modulated signals (e.g., including complementary code keying (CCK), orthogonal frequency division multiplexing (OFDM), and/or single-carrier frequency division multiple access (SC-FDMA) symbols) although the embodiments are not limited to any specific over-the-air interface or modulation scheme. Radio interface 1710 may include, for example, a receiver 1712, a frequency synthesizer 1714, and/or a transmitter 1716. Radio interface 1710 may include bias controls, a crystal oscillator and/or one or more antennas 1718-f. In another embodiment, radio interface 1710 may use external voltage-controlled oscillators (VCOs), surface acoustic wave filters, intermediate frequency (IF) filters and/or RF filters, as desired. Due to the variety of potential RF interface designs an expansive description thereof is omitted.

Baseband circuitry 1720 may communicate with radio interface 1710 to process receive and/or transmit signals and may include, for example, a mixer for down-converting received RF signals, an analog-to-digital converter 1722 for converting analog signals to digital form, a digital-to-analog converter 1724 for converting digital signals to analog form, and a mixer for up-converting signals for transmission. Further, baseband circuitry 1720 may include a baseband or physical layer (PHY) processing circuit 1726 for PHY link layer processing of respective receive/transmit signals. Baseband circuitry 1720 may include, for example, a medium access control (MAC) processing circuit 1727 for MAC/data link layer processing. Baseband circuitry 1720 may include a memory controller 1732 for communicating with MAC processing circuit 1727 and/or a computing platform 1730, for example, via one or more interfaces 1734.

In some embodiments, PHY processing circuit 1726 may include a frame construction and/or detection module, in combination with additional circuitry such as a buffer memory, to construct and/or deconstruct communication frames. Alternatively or in addition, MAC processing circuit 1727 may share processing for certain of these functions or perform these processes independent of PHY processing circuit 1726. In some embodiments, MAC and PHY processing may be integrated into a single circuit.

The computing platform 1730 may provide computing functionality for the device 1700. As shown, the computing platform 1730 may include a processing component 1740. In addition to, or alternatively of, the baseband circuitry 1720, the device 1700 may execute processing operations or logic for one or more of LTE-U eNB 102, LTE-U UE 104, logic flow 1200 of FIG. 12, logic flow 1300 of FIG. 13, logic flow 1400 of FIG. 14, storage medium 1500 of FIG. 15, UE 1600 of FIG. 16, and logic circuit 1728 using the processing component 1740. The processing component 1740 (and/or PHY 1726 and/or MAC 1727) may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The computing platform 1730 may further include other platform components 1750. Other platform components 1750 include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information.

Device 1700 may be, for example, an ultra-mobile device, a mobile device, a fixed device, a machine-to-machine (M2M) device, a personal digital assistant (PDA), a mobile computing device, a smart phone, a telephone, a digital telephone, a cellular telephone, user equipment, eBook readers, a handset, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a minicomputer, a main frame computer, a supercomputer, a network appliance, a web appliance, a distributed computing system, multiprocessor systems, processor-based systems, consumer electronics, programmable consumer electronics, game devices, display, television, digital television, set top box, wireless access point, base station, node B, subscriber station, mobile subscriber center, radio network controller, router, hub, gateway, bridge, switch, machine, or combination thereof. Accordingly, functions and/or specific configurations of device 1700 described herein, may be included or omitted in various embodiments of device 1700, as suitably desired.

Embodiments of device 1700 may be implemented using single input single output (SISO) architectures. However, certain implementations may include multiple antennas (e.g., antennas 1718-*f*) for transmission and/or reception using adaptive antenna techniques for beamforming or spatial division multiple access (SDMA) and/or using MIMO communication techniques.

The components and features of device 1700 may be implemented using any combination of discrete circuitry, application specific integrated circuits (ASICs), logic gates and/or single chip architectures. Further, the features of device 1700 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It should be appreciated that the exemplary device 1700 shown in the block diagram of FIG. 17 may represent one functionally descriptive example of many potential implementations. Accordingly, division, omission or inclusion of block functions depicted in the accompanying figures does not infer that the hardware components, circuits, software and/or elements for implementing these functions would be necessarily be divided, omitted, or included in embodiments.

Figure 18:
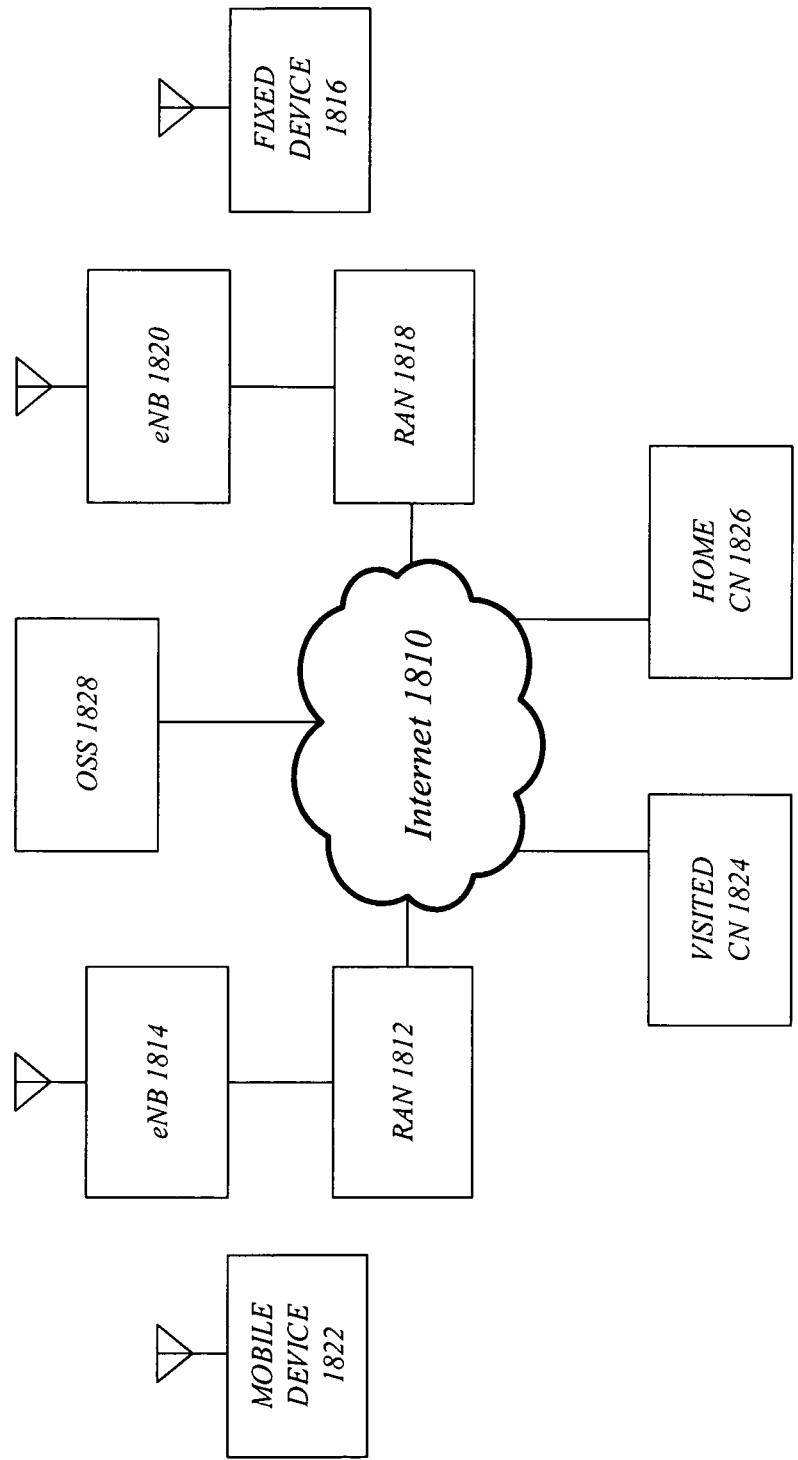
FIG. 18 illustrates an embodiment of a wireless network.

FIG. 18 illustrates an embodiment of a broadband wireless access system 1800. As shown in FIG. 18, broadband wireless access system 1800 may be an internet protocol (IP) type network comprising an internet 1810 type network or the like that is capable of supporting mobile wireless access and/or fixed wireless access to internet 1810. In one or more embodiments, broadband wireless access system 1800 may comprise any type of orthogonal frequency division multiple access (OFDMA)-based or single-carrier frequency division multiple access (SC-FDMA)-based wireless network, such as a system compliant with one or more of the 3GPP LTE Specifications and/or IEEE 802.16 Standards, and the scope of the claimed subject matter is not limited in these respects.

In the exemplary broadband wireless access system 1800, radio access networks (RANs) 1812 and 1818 are capable of coupling with evolved node Bs (eNBs) 1814 and 1820, respectively, to provide wireless communication between one or more fixed devices 1816 and internet 1810 and/or between or one or more mobile devices 1822 and Internet 1810. One example of a fixed device 1816 and a mobile device 1822 is device 1700 of FIG. 17, with the fixed device 1816 comprising a stationary version of device 1700 and the mobile device 1822 comprising a mobile version of device 1700. RANs 1812 and 1818 may implement profiles that are capable of defining the mapping of network functions to one or more physical entities on broadband wireless access system 1800. eNBs 1814 and 1820 may comprise radio equipment to provide RF communication with fixed device 1816 and/or mobile device 1822, such as described with reference to device 1700, and may comprise, for example, the PHY and MAC layer equipment in compliance with a 3GPP LTE Specification or an IEEE 802.16 Standard. eNBs 1814 and 1820 may further comprise an IP backplane to couple to Internet 1810 via RANs 1812 and 1818, respectively, although the scope of the claimed subject matter is not limited in these respects.

Broadband wireless access system 1800 may further comprise a visited core network (CN) 1824 and/or a home CN 1826, each of which may be capable of providing one or more network functions including but not limited to proxy and/or relay type functions, for example authentication, authorization and accounting (AAA) functions, dynamic host configuration protocol (DHCP) functions, or domain name service controls or the like, domain gateways such as public switched telephone network (PSTN) gateways or voice over internet protocol (VoIP) gateways, and/or internet protocol (IP) type server functions, or the like. However, these are merely example of the types of functions that are capable of being provided by visited CN 1824 and/or home CN 1826, and the scope of the claimed subject matter is not limited in these respects. Visited CN 1824 may be referred to as a visited CN in the case where visited CN 1824 is not part of the regular service provider of fixed device 1816 or mobile device 1822, for example where fixed device 1816 or mobile device 1822 is roaming away from its respective home CN 1826, or where broadband wireless access system 1800 is part of the regular service provider of fixed device 1816 or mobile device 1822 but where broadband wireless access system 1800 may be in another location or state that is not the main or home location of fixed device 1816 or mobile device 1822. The embodiments are not limited in this context.

Fixed device 1816 may be located anywhere within range of one or both of eNBs 1814 and 1820, such as in or near a home or business to provide home or business customer broadband access to Internet 1810 via eNBs 1814 and 1820 and RANs 1812 and 1818, respectively, and home CN 1826. It is worthy of note that although fixed device 1816 is generally disposed in a stationary location, it may be moved to different locations as needed. Mobile device 1822 may be utilized at one or more locations if mobile device 1822 is within range of one or both of eNBs 1814 and 1820, for example. In accordance with one or more embodiments, operation support system (OSS) 1828 may be part of broadband wireless access system 1800 to provide management functions for broadband wireless access system 1800 and to provide interfaces between functional entities of broadband wireless access system 1800. Broadband wireless access system 1800 of FIG. 18 is merely one type of wireless network showing a certain number of the components of broadband wireless access system 1800, and the scope of the claimed subject matter is not limited in these respects.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor. Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

The following examples pertain to further embodiments:

Example 1 is an apparatus, comprising at least one memory, and logic for user equipment (UE), at least a portion of the logic comprised in circuitry coupled to the at least one memory, the logic to cause the UE to receive an uplink (UL) grant indicating a transmit subframe, the transmit subframe to comprise a subframe during which the UE is authorized to perform UL transmission via an unlicensed carrier, determine whether the UL grant comprises a listen-before-talk (LBT)-contingent UL grant, and in response to a determination that the UL grant comprises an LBT-contingent UL grant identify an LBT interval for the transmit subframe, and perform an LBT procedure during the LBT interval to determine whether the unlicensed carrier is idle.

Example 2 is the apparatus of Example 1, the logic to cause the UE to perform UL transmission to an evolved node B (eNB) via the unlicensed carrier during the transmit subframe in response to a determination that the unlicensed carrier is idle.

Example 3 is the apparatus of any of Examples 1 to 2, the LBT procedure to comprise performing a first clear channel assessment (CCA), determining that the unlicensed carrier is idle when the first CCA indicates that the unlicensed carrier is idle, and when the first CCA indicates that the unlicensed carrier is not idle, determining whether to perform a second CCA based on whether sufficient time remains until a scheduled start time for the uplink transmission.

Example 4 is the apparatus of Example 3, the LBT procedure to comprise performing at least one enhanced CCA (eCCA).

Example 5 is the apparatus of any of Examples 1 to 2, the LBT procedure to comprise performing one clear channel assessment (CCA), determining that the unlicensed carrier is idle when the CCA indicates that the unlicensed carrier is idle, and determining that the unlicensed carrier is not idle when the CCA indicates that the unlicensed carrier is not idle.

Example 6 is the apparatus of any of Examples 1 to 5, the LBT interval to comprise a duration of one or more orthogonal frequency-division multiplexing (OFDM) symbols.

Example 7 is the apparatus of any of Examples 1 to 6, the LBT interval to comprise one or more punctured orthogonal frequency-division multiplexing (OFDM) symbols.

Example 8 is the apparatus of Example 7, the logic to cause the UE to identify the LBT interval based on LBT configuration information received from an evolved node B (eNB).

Example 9 is the apparatus of any of Examples 1 to 8, the LBT interval to comprise an initial portion of the transmit subframe.

Example 10 is the apparatus of any of Examples 1 to 8, the LBT interval to comprise a concluding portion of a subframe immediately preceding the transmit subframe.

Example 11 is a system, comprising an apparatus according to any of Examples 1 to 10, at least one radio frequency (RF) transceiver.

Example 12 is the system of Example 11, comprising at least one RF antenna.

Example 13 is the system of any of Examples 11 to 12, comprising a touchscreen display.

Example 14 is a method, comprising identifying, by circuitry of user equipment (UE), a transmit subframe based on a listen-before-talk (LBT)-contingent uplink grant received from an evolved node B (eNB), performing an LBT procedure during an LBT interval for the transmit subframe to determine whether a Long Term Evolution in Unlicensed Spectrum (LTE-U) carrier is clear, in response to a determination that the LTE-U carrier is clear, performing uplink transmission during the transmit subframe, and in response to a determination that the LTE-U carrier is not clear, refraining from transmission during the transmit subframe.

Example 15 is the method of Example 14, the transmit subframe to comprise a subframe during which the UE is authorized to perform uplink transmission to the eNB pending the determination that the LTE-U carrier is clear.

Example 16 is the method of any of Examples 14 to 15, the LBT procedure to comprise performing a first clear channel assessment (CCA), determining that the LTE-U carrier is clear when the first CCA indicates that the LTE-U carrier is clear, and when the first CCA indicates that the LTE-U carrier is not clear, determining whether to perform a second CCA based on whether sufficient time remains until a scheduled start time for the uplink transmission.

Example 17 is the method of Example 16, the LBT procedure to comprise performing at least one enhanced CCA (eCCA).

Example 18 is the method of any of Examples 14 to 15, the LBT procedure to comprise performing one clear channel assessment (CCA), determining that the LTE-U carrier is clear when the CCA indicates that the LTE-U carrier is clear, and determining that the LTE-U carrier is not clear when the CCA indicates that the LTE-U carrier is not clear.

Example 19 is the method of any of Examples 14 to 18, the LBT interval to comprise a duration of one or more orthogonal frequency-division multiplexing (OFDM) symbols.

Example 20 is the method of any of Examples 14 to 19, the LBT interval to comprise one or more punctured orthogonal frequency-division multiplexing (OFDM) symbols.

Example 21 is the method of Example 20, comprising identifying the LBT interval based on LBT configuration information received from the eNB.

Example 22 is the method of any of Examples 14 to 21, the LBT interval to comprise an initial portion of the transmit subframe.

Example 23 is the method of any of Examples 14 to 21, the LBT interval to comprise a concluding portion of a subframe immediately preceding the transmit subframe.

Example 24 is at least one computer-readable storage medium comprising a set of instructions that, in response to being executed on a computing device, cause the computing device to perform a method according to any of Examples 14 to 23.

Example 25 is an apparatus, comprising means for performing a method according to any of Examples 14 to 23.

Example 26 is a system, comprising the apparatus of Example 25, at least one radio frequency (RF) transceiver.

Example 27 is the system of Example 26, comprising at least one RF antenna.

Example 28 is the system of any of Examples 26 to 27, comprising a touchscreen display.

Example 29 is user equipment (UE), comprising a radio frequency (RF) antenna, an RF transceiver, and logic, at least a portion of which is in circuitry coupled to the RF transceiver, the logic to cause the UE to identify a listen-before-talk (LBT) interval based on a uplink (UL) grant received from an evolved node B (eNB), perform an LBT procedure during the LBT interval to determine whether an unlicensed carrier is idle, the LBT procedure to comprise at least one clear-channel assessment (CCA), and transmit data to the eNB over the unlicensed carrier during a transmit subframe indicated by the UL grant in response to a determination during the LBT procedure that the unlicensed carrier is idle.

Example 30 is the UE of Example 29, the logic to cause the UE to refrain from transmission over the unlicensed carrier during the transmit subframe in response to a determination during the LBT procedure that the unlicensed carrier is not idle.

Example 31 is the UE of any of Examples 29 to 30, the LBT procedure to comprise performing a first clear channel assessment (CCA), determining that the unlicensed carrier is idle when the first CCA indicates that the unlicensed carrier is idle, and when the first CCA indicates that the unlicensed carrier is not idle, determining whether to perform a second CCA based on whether sufficient time remains until a scheduled start time for uplink transmission during the transmit subframe.

Example 32 is the UE of Example 31, the LBT procedure to comprise performing at least one enhanced CCA (eCCA).

Example 33 is the UE of any of Examples 29 to 30, the LBT procedure to comprise performing one clear channel assessment (CCA), determining that the unlicensed carrier is idle when the CCA indicates that the unlicensed carrier is idle, and determining that the unlicensed carrier is not idle when the CCA indicates that the unlicensed carrier is not idle.

Example 34 is the UE of any of Examples 29 to 33, the LBT interval to comprise a duration of one or more orthogonal frequency-division multiplexing (OFDM) symbols.

Example 35 is the UE of any of Examples 29 to 34, the LBT interval to comprise one or more punctured orthogonal frequency-division multiplexing (OFDM) symbols.

Example 36 is the UE of Example 35, the logic to cause the UE to identify the LBT interval based on LBT configuration information received from an evolved node B (eNB).

Example 37 is the UE of any of Examples 29 to 36, the LBT interval to comprise an initial portion of the transmit subframe.

Example 38 is the UE of any of Examples 29 to 36, the LBT interval to comprise a concluding portion of a subframe immediately preceding the transmit subframe.

Example 39 is a system, comprising an apparatus according to any of Examples 29 to 38, at least one radio frequency (RF) transceiver.

Example 40 is the system of Example 39, comprising at least one RF antenna.

Example 41 is the system of any of Examples 39 to 40, comprising a touchscreen display.

Example 42 is a method, comprising receiving, at user equipment (UE), an uplink (UL) grant indicating a transmit subframe, the transmit subframe to comprise a subframe during which the UE is authorized to perform UL transmission via a Long Term Evolution in Unlicensed Spectrum (LTE-U) carrier, determining, by circuitry of the UE, whether the UL grant comprises a listen-before-talk (LBT)-contingent UL grant, and in response to a determination that the UL grant comprises an LBT-contingent UL grant identifying an LBT interval for the transmit subframe, and performing an LBT procedure during the LBT interval to determine whether the LTE-U carrier is idle.

Example 43 is the method of Example 42, comprising performing UL transmission to an evolved node B (eNB) via the LTE-U carrier during the transmit subframe in response to a determination that the LTE-U carrier is idle.

Example 44 is the method of any of Examples 42 to 43, the LBT procedure to comprise performing a first clear channel assessment (CCA), determining that the LTE-U carrier is idle when the first CCA indicates that the LTE-U carrier is idle, and when the first CCA indicates that the LTE-U carrier is not idle, determining whether to perform a second CCA based on whether sufficient time remains until a scheduled start time for the uplink transmission.

Example 45 is the method of Example 44, the LBT procedure to comprise performing at least one enhanced CCA (eCCA).

Example 46 is the method of any of Examples 42 to 43, the LBT procedure to comprise performing one clear channel assessment (CCA), determining that the LTE-U carrier is idle when the CCA indicates that the LTE-U carrier is idle, and determining that the LTE-U carrier is not idle when the CCA indicates that the LTE-U carrier is not idle.

Example 47 is the method of any of Examples 42 to 46, the LBT interval to comprise a duration of one or more orthogonal frequency-division multiplexing (OFDM) symbols.

Example 48 is the method of any of Examples 42 to 47, the LBT interval to comprise one or more punctured orthogonal frequency-division multiplexing (OFDM) symbols.

Example 49 is the method of Example 48, comprising identifying the LBT interval based on LBT configuration information received from an evolved node B (eNB).

Example 50 is the method of any of Examples 42 to 49, the LBT interval to comprise an initial portion of the transmit subframe.

Example 51 is the method of any of Examples 42 to 49, the LBT interval to comprise a concluding portion of a subframe immediately preceding the transmit subframe.

Example 52 is at least one computer-readable storage medium comprising a set of instructions that, in response to being executed on a computing device, cause the computing device to perform a method according to any of Examples 42 to 51.

Example 53 is an apparatus, comprising means for performing a method according to any of Examples 42 to 51.

Example 54 is a system, comprising the apparatus of Example 53, at least one radio frequency (RF) transceiver.

Example 55 is the system of Example 54, comprising at least one RF antenna.

Example 56 is the system of any of Examples 54 to 55, comprising a touchscreen display.

Example 57 is an apparatus, comprising at least one memory, and logic for user equipment (UE), at least a portion of the logic comprised in circuitry coupled to the at least one memory, the logic to cause the UE to identify a transmit subframe based on a listen-before-talk (LBT)-contingent uplink grant received from an evolved node B (eNB), performing an LBT procedure during an LBT interval for the transmit subframe to determine whether an unlicensed carrier is clear, in response to a determination that the unlicensed carrier is clear, performing uplink transmission during the transmit subframe, and in response to a determination that the unlicensed carrier is not clear, refraining from transmission during the transmit subframe.

Example 58 is the apparatus of Example 57, the transmit subframe to comprise a subframe during which the UE is authorized to perform uplink transmission to the eNB pending the determination that the unlicensed carrier is clear.

Example 59 is the apparatus of any of Examples 57 to 58, the LBT procedure to comprise performing a first clear channel assessment (CCA), determining that the unlicensed carrier is clear when the first CCA indicates that the unlicensed carrier is clear, and when the first CCA indicates that the unlicensed carrier is not clear, determining whether to perform a second CCA based on whether sufficient time remains until a scheduled start time for the uplink transmission.

Example 60 is the apparatus of Example 59, the LBT procedure to comprise performing at least one enhanced CCA (eCCA).

Example 61 is the apparatus of any of Examples 57 to 58, the LBT procedure to comprise performing one clear channel assessment (CCA), determining that the unlicensed carrier is clear when the CCA indicates that the unlicensed carrier is clear, and determining that the unlicensed carrier is not clear when the CCA indicates that the unlicensed carrier is not clear.

Example 62 is the apparatus of any of Examples 57 to 61, the LBT interval to comprise a duration of one or more orthogonal frequency-division multiplexing (OFDM) symbols.

Example 63 is the apparatus of any of Examples 57 to 62, the LBT interval to comprise one or more punctured orthogonal frequency-division multiplexing (OFDM) symbols.

Example 64 is the apparatus of Example 63, the logic to cause the UE to identify the LBT interval based on LBT configuration information received from the eNB.

Example 65 is the apparatus of any of Examples 57 to 64, the LBT interval to comprise an initial portion of the transmit subframe.

Example 66 is the apparatus of any of Examples 57 to 64, the LBT interval to comprise a concluding portion of a subframe immediately preceding the transmit subframe.

Example 67 is a system, comprising an apparatus according to any of Examples 57 to 66, at least one radio frequency (RF) transceiver.

Example 68 is the system of Example 67, comprising at least one RF antenna.

Example 69 is the system of any of Examples 67 to 68, comprising a touchscreen display.

Example 70 is a method, comprising identifying, by circuitry of user equipment (UE), a listen-before-talk (LBT) interval based on a uplink (UL) grant received from an evolved node B (eNB), performing an LBT procedure during the LBT interval to determine whether a Long Term Evolution in Unlicensed Spectrum (LTE-U) carrier is idle, the LBT procedure to comprise at least one clear-channel assessment (CCA), and transmitting data to the eNB over the LTE-U carrier during a transmit subframe indicated by the UL grant in response to a determination during the LBT procedure that the LTE-U carrier is idle.

Example 71 is the method of Example 70, comprising refraining from transmission over the LTE-U carrier during the transmit subframe in response to a determination during the LBT procedure that the LTE-U carrier is not idle.

Example 72 is the method of any of Examples 70 to 71, the LBT procedure to comprise performing a first clear channel assessment (CCA), determining that the LTE-U carrier is idle when the first CCA indicates that the LTE-U carrier is idle, and when the first CCA indicates that the LTE-U carrier is not idle, determining whether to perform a second CCA based on whether sufficient time remains until a scheduled start time for uplink transmission during the transmit subframe.

Example 73 is the method of Example 72, the LBT procedure to comprise performing at least one enhanced CCA (eCCA).

Example 74 is the method of any of Examples 70 to 71, the LBT procedure to comprise performing one clear channel assessment (CCA), determining that the LTE-U carrier is idle when the CCA indicates that the LTE-U carrier is idle, and determining that the LTE-U carrier is not idle when the CCA indicates that the LTE-U carrier is not idle.

Example 75 is the method of any of Examples 70 to 74, the LBT interval to comprise a duration of one or more orthogonal frequency-division multiplexing (OFDM) symbols.

Example 76 is the method of any of Examples 70 to 75, the LBT interval to comprise one or more punctured orthogonal frequency-division multiplexing (OFDM) symbols.

Example 77 is the method of Example 76, comprising identifying the LBT interval based on LBT configuration information received from an evolved node B (eNB).

Example 78 is the method of any of Examples 70 to 77, the LBT interval to comprise an initial portion of the transmit subframe.

Example 79 is the method of any of Examples 70 to 77, the LBT interval to comprise a concluding portion of a subframe immediately preceding the transmit subframe.

Example 80 is at least one computer-readable storage medium comprising a set of instructions that, in response to being executed on a computing device, cause the computing device to perform a method according to any of Examples 70 to 79.

Example 81 is an apparatus, comprising means for performing a method according to any of Examples 70 to 79.

Example 82 is a system, comprising the apparatus of Example 81, at least one radio frequency (RF) transceiver.

Example 83 is the system of Example 82, comprising at least one RF antenna.

Example 84 is the system of any of Examples 82 to 83, comprising a touchscreen display.

Numerous specific details have been set forth herein to provide a thorough understanding of the embodiments. It will be understood by those skilled in the art, however, that the embodiments may be practiced without these specific details. In other instances, well-known operations, components, and circuits have not been described in detail so as not to obscure the embodiments. It can be appreciated that the specific structural and functional details disclosed herein may be representative and do not necessarily limit the scope of the embodiments.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

It should be noted that the methods described herein do not have to be executed in the order described, or in any particular order. Moreover, various activities described with respect to the methods identified herein can be executed in serial or parallel fashion.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. It is to be understood that the above description has been made in an illustrative fashion, and not a restrictive one. Combinations of the above embodiments, and other embodiments not specifically described herein will be apparent to those of skill in the art upon reviewing the above description. Thus, the scope of various embodiments includes any other applications in which the above compositions, structures, and methods are used.

It is emphasized that the Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate preferred embodiment. In the appended claims, the terms "including" and "in which" are used as the plain-English equivalents of the respective terms "comprising" and "wherein," respectively. Moreover, the terms "first," "second," and "third," etc. are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An apparatus, comprising:
   at least one memory; and
   logic for user equipment (UE), at least a portion of the logic comprised in circuitry coupled to the at least one memory, the logic to cause the UE to:
   receive an uplink (UL) grant indicating a transmit subframe, the transmit subframe to comprise a subframe during which the UE is authorized to perform UL transmission via an unlicensed carrier;
   determine whether the UL grant comprises a listen-before-talk (LBT)-contingent UL grant; and
   in response to a determination that the UL grant comprises an LBT-contingent UL grant:
   identify an LBT interval for the transmit subframe; and
   perform an LBT procedure during the LBT interval to determine whether the unlicensed carrier is idle, the LBT procedure to comprise performing multiple clear channel assessments (CCAs), wherein the LBT procedure comprises, prior to performing each CCA of the multiple CCAs:
   determining whether sufficient time remains before a scheduled start time of the UL transmission; and
   in response to a determination that sufficient time does not remain before the scheduled start time of the UL transmission, terminating the LBT procedure without performing the UL transmission.

2. The apparatus of claim 1, the logic to cause the UE to perform UL transmission to an evolved node B (eNB) via the unlicensed carrier during the transmit subframe in response to a determination that the unlicensed carrier is idle.

3. The apparatus of claim 1, the LBT procedure to comprise performing at least one enhanced CCA (eCCA).

4. The apparatus of claim 1, the LBT interval to comprise one or more punctured orthogonal frequency-division multiplexing (OFDM) symbols.

5. The apparatus of claim 1, the LBT interval to comprise an initial portion of the transmit subframe.

6. The apparatus of claim 1, the LBT interval to comprise a concluding portion of a subframe immediately preceding the transmit subframe.

7. A system, comprising:
   the apparatus of claim 1;
   at least one radio frequency (RF) transceiver; and
   at least one RF antenna.

8. At least one non-transitory computer-readable storage medium comprising a set of instructions that, in response to being executed at user equipment (UE), cause the UE to:
   identify a transmit subframe based on a listen-before-talk (LBT)-contingent uplink grant received from an evolved node B (eNB);
   perform an LBT procedure during an LBT interval for the transmit subframe to determine whether a Long Term Evolution in Unlicensed Spectrum (LTE-U) carrier is clear, the LBT procedure to comprise performing multiple clear channel assessments (CCAs), wherein the LBT procedure comprises, prior to performing each CCA of the multiple CCAs:
   determining whether sufficient time remains before a scheduled start time of the transmit subframe; and
   in response to a determination that sufficient time does not remain before the scheduled start time of the transmit subframe, terminating the LBT procedure without performing uplink transmission;
   in response to a determination that the LTE-U carrier is clear, perform uplink transmission during the transmit subframe; and
   in response to a determination that the LTE-U carrier is not clear, refrain from transmission during the transmit subframe.

9. The at least one computer-readable storage medium of claim 8, the transmit subframe to comprise a subframe during which the UE is authorized to perform uplink transmission to the eNB pending the determination that the LTE-U carrier is clear.

10. The at least one computer-readable storage medium of claim 8, the LBT procedure to comprise performing at least one enhanced CCA (eCCA).

11. The at least one computer-readable storage medium of claim 8, the LBT interval to comprise one or more punctured orthogonal frequency-division multiplexing (OFDM) symbols.

12. The at least one computer-readable storage medium of claim 8, the LBT interval to comprise an initial portion of the transmit subframe.

13. The at least one computer-readable storage medium of claim 8, the LBT interval to comprise a concluding portion of a subframe immediately preceding the transmit subframe.

14. User equipment (UE), comprising:
   a radio frequency (RF) antenna;
   an RF transceiver; and
   logic, at least a portion of which is in circuitry coupled to the RF transceiver, the logic to cause the UE to:
   identify a listen-before-talk (LBT) interval based on an uplink (UL) grant received from an evolved node B (eNB);
   perform an LBT procedure during the LBT interval to determine whether an unlicensed carrier is idle, the LBT procedure to comprise performing multiple clear channel assessments (CCAs), wherein the LBT procedure comprises, prior to performing each CCA of the multiple CCAs:
   determining whether sufficient time remains before a scheduled start time of a UL transmission associated with the UL grant; and
   in response to determining that sufficient time does not remain before the scheduled start time of the UL transmission, terminating the LBT procedure without performing the UL transmission; and transmit data to the eNB over the unlicensed carrier during a transmit subframe indicated by the UL grant in response to a determination during the LBT procedure that the unlicensed carrier is idle.

15. The UE of claim 14, the logic to cause the UE to refrain from transmission over the unlicensed carrier during the transmit subframe in response to a determination during the LBT procedure that the unlicensed carrier is not idle.

16. The UE of claim 14, the LBT procedure to comprise performing at least one enhanced CCA (eCCA).

17. The UE of claim 14, the LBT interval to comprise one or more punctured orthogonal frequency-division multiplexing (OFDM) symbols.

18. The UE of claim 14, the LBT interval to comprise an initial portion of the transmit subframe.

19. The UE of claim 14, the LBT interval to comprise a concluding portion of a subframe immediately preceding the transmit subframe.

* * * * *